United States Patent
Zhou et al.

(10) Patent No.: US 12,150,205 B2
(45) Date of Patent: Nov. 19, 2024

(54) METHOD, APPARATUS, AND SYSTEM FOR SELECTING SESSION MANAGEMENT NETWORK ELEMENT

(71) Applicant: Huawei Technologies Co., Ltd., Shenzhen (CN)

(72) Inventors: Xiaoyun Zhou, Nanjing (CN); Zaifeng Zong, Nanjing (CN)

(73) Assignee: HUAWEI TECHNOLOIGES CO., LTD., Shenzhen (CN)

(*) Notice: Subject to any disclaimer, the term of this patent is extended or adjusted under 35 U.S.C. 154(b) by 404 days.

(21) Appl. No.: 17/582,528

(22) Filed: Jan. 24, 2022

(65) Prior Publication Data
US 2022/0150683 A1 May 12, 2022

Related U.S. Application Data

(63) Continuation of application No. PCT/CN2020/086879, filed on Apr. 24, 2020.

(30) Foreign Application Priority Data
Jul. 23, 2019 (CN) .......................... 201910668398.9

(51) Int. Cl.
*H04W 8/02* (2009.01)
*H04L 67/14* (2022.01)
*H04W 60/00* (2009.01)

(52) U.S. Cl.
CPC ............... *H04W 8/02* (2013.01); *H04L 67/14* (2013.01); *H04W 60/00* (2013.01)

(58) Field of Classification Search
CPC ....... H04W 8/02; H04W 60/00; H04W 60/04; H04W 76/12; H04W 48/17; H04W 76/11; H04W 24/02; H04L 67/14; H04L 65/40
See application file for complete search history.

(56) References Cited

U.S. PATENT DOCUMENTS

2018/0192471 A1* 7/2018 Li ........................... H04W 4/50
2019/0215724 A1 7/2019 Talebi Fard et al.
(Continued)

FOREIGN PATENT DOCUMENTS

WO 2018127148 A1 7/2018
WO 2018170755 A1 9/2018
(Continued)

OTHER PUBLICATIONS

Garcia-Martin, Miguel A., Marco Gramaglia, and Pablo Serrano. "Network automation and data analytics in 3gpp 5g systems." IEEE Network (2023). (Year: 2023).*
(Continued)

*Primary Examiner* — Sharad Rampuria
(74) *Attorney, Agent, or Firm* — Conley Rose, P.C.

(57) ABSTRACT

A method, an apparatus, and a system for selecting a session management network element, where the method includes: A mobility management network element determines a first DNAI corresponding to a first session of a terminal device. The mobility management network element selects, for the first session of the terminal device, a first session management network element that supports all or a part of DNAIs in the first DNAI. Based on this solution, the mobility management network element selects the session management network element for the terminal device. The session management network element supports all or a part of the DNAIs in the first DNAI. Therefore, a user plane network element selected by the session management network element also supports all or a part of the DNAIs in the first DNAI, such that a proper session management network element is selected for the terminal device.

20 Claims, 10 Drawing Sheets

(56) References Cited

U.S. PATENT DOCUMENTS

| | | | | |
|---|---|---|---|---|
| 2019/0223250 A1* | 7/2019 | Dao | ................... | H04W 72/23 |
| 2020/0015131 A1 | 1/2020 | Ying | | |
| 2020/0221527 A1* | 7/2020 | Bharatia | .............. | H04W 76/22 |
| 2020/0351985 A1* | 11/2020 | Zhu | ................... | H04W 60/005 |
| 2022/0182890 A1* | 6/2022 | Shan | ................ | H04W 36/0016 |
| 2022/0346190 A1* | 10/2022 | Zhu | ..................... | H04W 8/065 |

FOREIGN PATENT DOCUMENTS

| | | |
|---|---|---|
| WO | 2018172182 A1 | 9/2018 |
| WO | 2018177656 A1 | 10/2018 |
| WO | 109995844 A | 7/2019 |
| WO | 2019137125 A1 | 7/2019 |

OTHER PUBLICATIONS

Green, P. "An introduction to network architectures and protocols." IEEE Transactions on Communications 28.4 (1980): 413-424. ( Year: 1980).*

3GPP TS 23.501 V16.1.0, "3rd Generation Partnership Project; Technical Specification Group Services and System Aspects; System Architecture for the 5G System; Stage 2 (Release 16)," Jun. 2019, 367 pages.

Huawei, et al., "New SID: Study on enhancement of support for Edge Computing in 5GC," SA WG2 Meeting #131, S2-1901833, Tenerife, Spain, Feb. 25-Mar. 1, 2019, 4 pages.

* cited by examiner

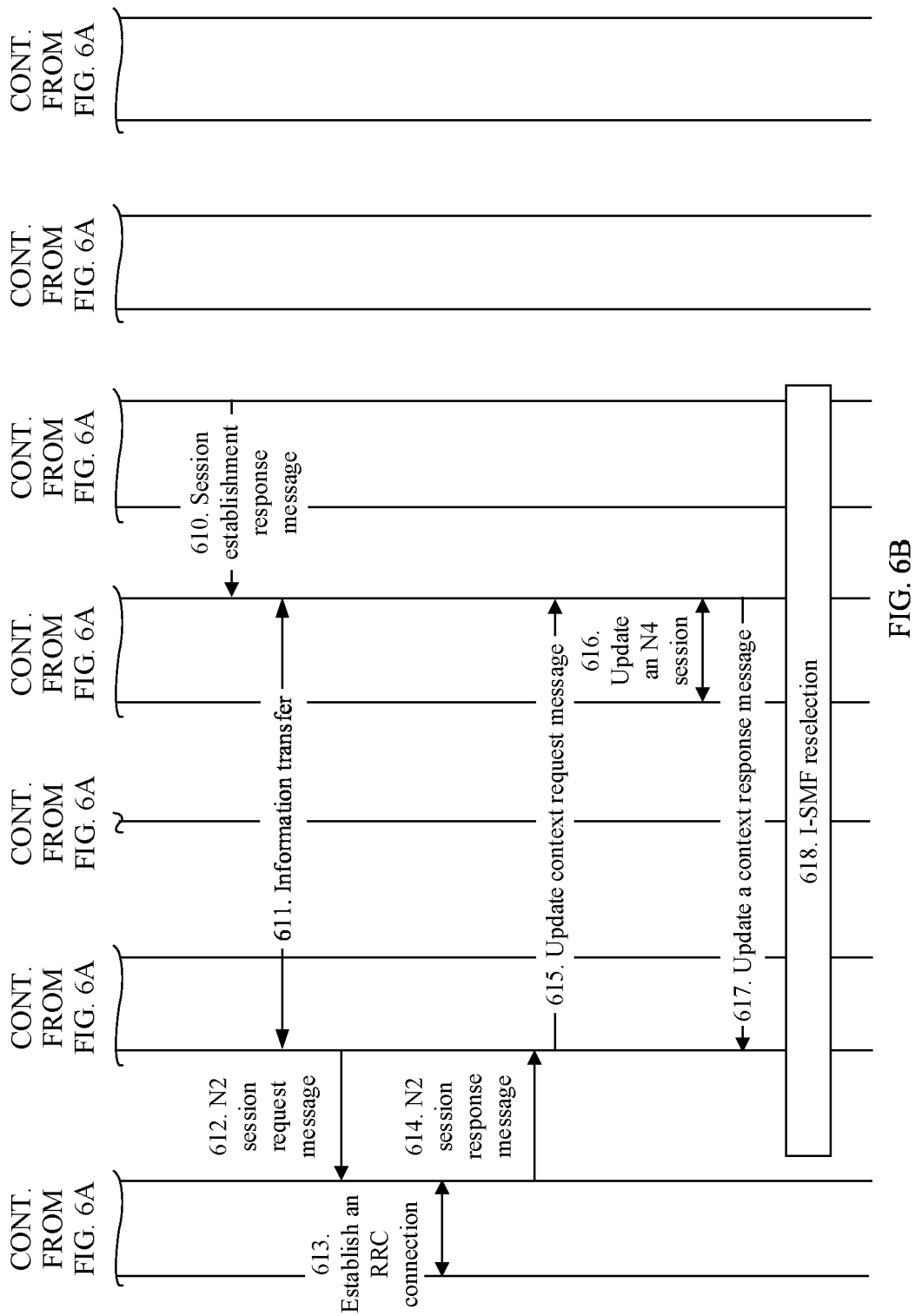

METHOD, APPARATUS, AND SYSTEM FOR SELECTING SESSION MANAGEMENT NETWORK ELEMENT

CROSS-REFERENCE TO RELATED APPLICATIONS

This application is a continuation of International Patent Application No. PCT/CN2020/086879, filed on Apr. 24, 2020, which claims priority to Chinese Patent Application No. 201910668398.9, filed on Jul. 23, 2019. The disclosures of the aforementioned applications are hereby incorporated by reference in their entireties.

TECHNICAL FIELD

This application relates to the field of mobile communications technologies, and in particular, to a method, an apparatus, and a system for selecting a session management network element.

BACKGROUND

In a 5th generation (5G) system, a terminal device establishes a session after accessing a network (herein, descriptions are provided using an example in which the session is a protocol data unit (PDU) session), and accesses an external data network using the PDU session, to implement interaction between the terminal device and an application server deployed in the data network.

In an application access process, a change of an access location of the terminal device may cause a need of reselecting a session management network element for the terminal device. Currently, the session management network element is generally reselected for the terminal device based on location information of the terminal device after being moved.

SUMMARY

This application provides a method, an apparatus, and a system for selecting a session management network element, to select a proper session management network element for a terminal device.

According to a first aspect, this application provides a method for selecting a session management network element. The method includes: A mobility management network element determines a first data network access identifier (DNAI) corresponding to a first session of a terminal device. The mobility management network element selects, for the first session of the terminal device, a first session management network element that supports all or a part of DNAIs in the first DNAI.

Based on this solution, the mobility management network element selects the session management network element for the terminal device. The session management network element supports all or a part of the DNAIs in the first DNAI. Therefore, a user plane network element selected by the session management network element also supports all or a part of the DNAIs in the first DNAI. In other words, the session management network element is responsible for managing the user plane network element that support all or a part of the DNAIs in the first DNAI corresponding to the first session, such that a proper session management network element is selected for the terminal device. Using the selected session management network element, the user plane network element that supports the DNAI corresponding to the first session is selected as a PDU session anchor (PSA) for the terminal device, to reduce an alternative route and reduce a network delay.

In a possible implementation method, that the mobility management network element determines the first DNAI corresponding to the first session of the terminal device includes that the mobility management network element obtains first information, where the first information includes an identifier of a session of the terminal device and a second DNAI corresponding to the identifier of the session of the terminal device, where the second DNAI is one or more DNAIs, and where the identifier of the session of the terminal device includes an identifier of the first session. Additionally, the mobility management network element obtains the identifier of the first session, and the mobility management network element determines, based on the identifier of the first session and the first information, the first DNAI corresponding to the first session.

In a possible implementation method, the mobility management network element obtains second information. The second information includes the identifier of the first session and a third DNAI corresponding to the identifier of the first session. The mobility management network element determines a fourth DNAI based on the third DNAI. The mobility management network element selects, for the first session of the terminal device, a second session management network element that supports all or a part of DNAIs in the fourth DNAI.

In a possible implementation method, the fourth DNAI is the same as the third DNAI. Alternatively, the fourth DNAI includes the first DNAI and the third DNAI.

In a possible implementation method, that the mobility management network element obtains the first information includes that the mobility management network element receives the first information from a policy control network element or another mobility management network element.

In a possible implementation method, that the mobility management network element obtains the identifier of the first session includes: the mobility management network element receives a request message from the terminal device, where the request message includes the identifier of the first session, and where the request message is used to request to establish the first session; or the mobility management network element receives context information of the terminal device from another mobility management network element, where the context information includes the identifier of the first session.

In a possible implementation method, that the mobility management network element determines the first DNAI corresponding to the first session of the terminal device includes that the mobility management network element receives the first DNAI corresponding to the first session from a policy control network element or another mobility management network element.

In a possible implementation method, the mobility management network element selects a third session management network element for the first session of the terminal device. That the mobility management network element selects, for the first session, the first session management network element that supports all or a part of the DNAIs in the first DNAI includes that: if determining that the third session management network element does not support all or a part of the DNAIs in the first DNAI, the mobility management network element selects, for the first session, the first session management network element that supports all or a part of the DNAIs in the first DNAI.

In a possible implementation method, the mobility management network element receives a fifth DNAI corresponding to the first session from the policy control network element. The mobility management network element determines a sixth DNAI based on the fifth DNAI. The mobility management network element selects, for the first session of the terminal device, a fourth session management network element that supports all or a part of DNAIs in the sixth DNAI.

In a possible implementation method, the sixth DNAI is the same as the fifth DNAI. Alternatively, the sixth DNAI includes the first DNAI and the fifth DNAI.

In a possible implementation method, the identifier of the first session includes one or more of the following: a data network name (DNN) or single network slice selection assistance information (S-NSSAI).

In a possible implementation method, the mobility management network element obtains, from a network repository network element, a DNAI supported by the first session management network element.

According to a second aspect, this application provides a method for selecting a session management network element. The method includes: A policy control network element obtains first information. The first information includes an identifier of a session of a terminal device and a second DNAI corresponding to the identifier of the session of the terminal device. The second DNAI is one or more DNAIs. The policy control network element sends the first information to a mobility management network element. The first information is used by the mobility management network element to select a session management network element.

In a possible implementation method, that the policy control network element sends the first information to the mobility management network element includes that the policy control network element sends the first information to the mobility management network element in a registration process of the terminal device.

According to a third aspect, this application provides a method for selecting a session management network element. The method includes: A policy control network element obtains a first DNAI corresponding to a first session of a terminal device. The policy control network element sends, to the mobility management network element, the first DNAI corresponding to the first session.

In a possible implementation method, that the policy control network element sends, to the mobility management network element, the first DNAI corresponding to the first session includes that the policy control network element sends, to the mobility management network element in a session establishment process, the first DNAI corresponding to the first session.

According to a fourth aspect, this application provides an apparatus for selecting a session management network element. The apparatus may be a mobility management network element, or may be a chip used in a mobility management network element. The apparatus has a function of implementing the first aspect or the embodiments of first aspect. The function may be implemented by hardware, or may be implemented by hardware executing corresponding software. The hardware or the software includes one or more modules corresponding to the function.

According to a fifth aspect, this application provides an apparatus for selecting a session management network element. The apparatus may be a policy control network element, or may be a chip used in a policy control network element. The apparatus has a function of implementing the second aspect or each embodiment of the second aspect, or a function of implementing the third aspect or each embodiment of the third aspect. The function may be implemented by hardware, or may be implemented by hardware executing corresponding software. The hardware or the software includes one or more modules corresponding to the function.

According to a sixth aspect, this application provides an apparatus for selecting a session management network element, including a processor and a memory. The memory is configured to store computer execution instructions. When the apparatus runs, the processor executes the computer execution instructions stored in the memory, such that the apparatus performs the methods in the first aspect to the third aspect or the embodiments of the first aspect to the third aspect.

According to a seventh aspect, this application provides an apparatus for selecting a session management network element, including a unit or a means configured to implement the first aspect to the third aspect or perform each step in the first aspect to the third aspect.

According to an eighth aspect, this application provides an apparatus for selecting a session management network element, including a processor and an interface circuit. The processor is configured to: communicate with another apparatus using the interface circuit, and perform the methods in the first aspect to the third aspect or the embodiments of the first aspect to the third aspect. There are one or more processors.

According to a ninth aspect, this application provides an apparatus for selecting a session management network element, including a processor, configured to: connect to a memory and invoke a program stored in the memory to perform the methods in the first aspect to the third aspect or the embodiments of the first aspect to the third aspect. The memory may be located inside the apparatus, or may be located outside the apparatus. In addition, there are one or more processors.

According to a tenth aspect, this application further provides a computer-readable storage medium, and the computer-readable storage medium stores instructions. When the instructions are run on a computer, a processor is enabled to perform the methods in the foregoing aspects.

According to an eleventh aspect, this application further provides a computer program product that includes instructions. When the computer program product is run on a computer, the computer is enabled to perform the methods in the foregoing aspects.

According to a twelfth aspect, this application further provides a chip system. The system includes a processor, configured to perform the method according to the foregoing aspects.

According to a thirteenth aspect, this application provides a system for selecting a session management network element. The system includes a mobility management network element and a first session management network element.

The mobility management network element is configured to: determine a first DNAI corresponding to a first session of a terminal device; and select, for the first session of the terminal device, a first session management network element that supports all or a part of DNAIs in the first DNAI.

In a possible implementation method, a policy control network element is configured to: obtain first information; and send the first information to the mobility management network element.

That the mobility management network element is configured to obtain the first information includes that the mobility management network element is configured to receive the first information from the policy control network element.

In a possible implementation method, the system further includes the policy control network element, configured to: obtain the first DNAI corresponding to the first session of the terminal device, and send, to the mobility management network element, the first DNAI corresponding to the first session.

That the mobility management network element is configured to determine the first DNAI corresponding to the first session of the terminal device includes that the mobility management network element is configured to receive the first DNAI corresponding to the first session from the policy control network element or another mobility management network element.

In a possible implementation method, that the mobility management network element is configured to select, for the first session of the terminal device, the first session management network element that supports all or a part of the DNAIs in the first DNAI includes that the mobility management network element is configured to select, for the first session of the terminal device based on the first DNAI and the DNAI supported by the first session management network element, the first session management network element that supports all or a part of the DNAIs in the first DNAI.

In a possible implementation method, the system further includes a network repository network element. The mobility management network element is further configured to obtain, from the network repository network element, the DNAI supported by the first session management network element.

In a possible implementation method, the first session management network element is configured to: send a registration request message to the network repository network element, where the registration request message includes an identifier of the first session management network element and the DNAI supported by the first session management network element; and receive a registration response message from the network repository network element, where the registration response message is used to determine that registration is completed. The network repository network element is configured to: receive the registration request message from the first session management network element; store a correspondence between the identifier of the first session management network element and the DNAI supported by the first session management network element; and send the registration response message to the first session management network element.

BRIEF DESCRIPTION OF DRAWINGS

FIG. 6A and FIG. 6B are a schematic flowchart of another method for selecting an SMF according to this application;

DESCRIPTION OF EMBODIMENTS

To make the objectives, technical solutions, and advantages of this application clearer, the following further describes this application in detail with reference to the accompanying drawings. An operation in a method embodiment may also be applied to an apparatus embodiment or a system embodiment. In the descriptions of this application, unless otherwise specified, "a plurality of" means two or more.

Figure 1:
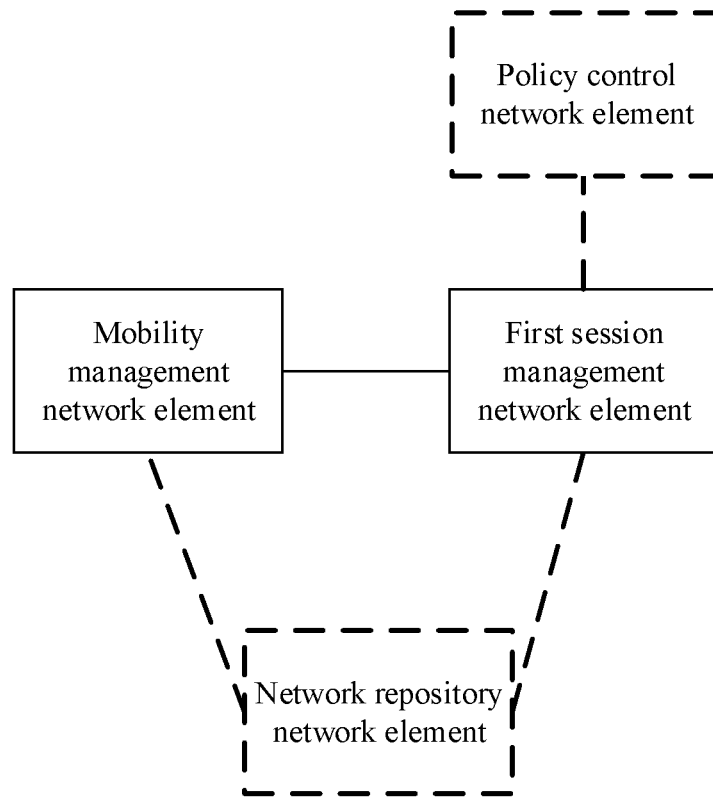
FIG. 1 is a schematic diagram of a system for selecting a session management network element according to this application.

To resolve the problem mentioned in the background, as shown in FIG. 1, this application provides a schematic diagram of a system for selecting a session management network element. The system includes a mobility management network element and a first session management network element. Optionally, the system further includes a policy control network element. The mobility management network element is configured to: determine a first DNAI corresponding to a first session of a terminal device; and select, for the first session of the terminal device, a first session management network element that supports all or a part of DNAIs in the first DNAI.

In a possible implementation method, that the mobility management network element is configured to determine the first DNAI corresponding to the first session of the terminal device includes that the mobility management network element is configured to: obtain first information, where the first information includes an identifier of a session of the terminal device and a second DNAI corresponding to the identifier of the session of the terminal device, the second DNAI is one or more DNAIs, and the identifier of the session of the terminal device includes an identifier of the first session; obtain the identifier of the first session; and determine, based on the identifier of the first session and the first information, the first DNAI corresponding to the first session.

In a possible implementation method, the mobility management network element is further configured to: obtain second information, where the second information includes the identifier of the first session and a third DNAI corresponding to the identifier of the first session; determine a fourth DNAI based on the third DNAI; and select, for the first session of the terminal device, a second session management network element that supports all or a part of DNAIs in the fourth DNAI.

In a possible implementation method, the fourth DNAI is the same as the third DNAI. Alternatively, the fourth DNAI includes the first DNAI and the third DNAI.

In a possible implementation method, the policy control network element is configured to: obtain the first information; and send the first information to the mobility management network element. That the mobility management network element is configured to obtain the first information includes that the mobility management network element is configured to receive the first information from the policy control network element.

In a possible implementation method, that the policy control network element is configured to send the first information to the mobility management network element includes that the policy control network element is configured to send the first information to the mobility management network element in a registration process of the terminal device.

In a possible implementation method, that the mobility management network element is configured to obtain the first information includes that the mobility management network element is configured to receive the first information from another mobility management network element.

In a possible implementation method, that the mobility management network element is configured to obtain the identifier of the first session includes that the mobility management network element is configured to: receive a request message from the terminal device, where the request message includes the identifier of the first session, and where the request message is used to request to establish the first session; or receive context information of the terminal device from another mobility management network element, where the context information includes the identifier of the first session.

In a possible implementation method, the policy control network element is configured to: obtain the first DNAI corresponding to the first session of the terminal device; and send, to the mobility management network element, the first DNAI corresponding to the first session. That the mobility management network element is configured to determine the first DNAI corresponding to the first session of the terminal device includes that the mobility management network element is configured to receive the first DNAI corresponding to the first session from the policy control network element or another mobility management network element.

In a possible implementation method, the mobility management network element is further configured to select a third session management network element for the first session of the terminal device. That the mobility management network element is configured to select, for the first session, the first session management network element that supports all or a part of the DNAIs in the first DNAI includes that the mobility management network element is configured to: if determining that the third session management network element does not support all or a part of the DNAIs in the first DNAI, select, for the first session, the first session management network element that supports all or a part of the DNAIs in the first DNAI.

In a possible implementation method, the mobility management network element is further configured to: receive a fifth DNAI corresponding to the first session from the policy control network element; determine a sixth DNAI based on the fifth DNAI; and select, for the first session of the terminal device, a fourth session management network element that supports all or a part of DNAIs in the sixth DNAI.

In a possible implementation method, the sixth DNAI is the same as the fifth DNAI. Alternatively, the sixth DNAI includes the first DNAI and the fifth DNAI.

In a possible implementation method, the identifier of the first session includes one or more of the following: a DNN or S-NSSAI.

In a possible implementation method, the system shown in FIG. 1 further includes a network repository network element. The mobility management network element is further configured to obtain, from the network repository network element, the DNAI supported by the first session management network element. In a possible implementation method, the first session management network element is configured to: send a registration request message to the network repository network element, where the registration request message includes an identifier of the first session management network element and the DNAI supported by the first session management network element; and receive a registration response message from the network repository network element, where the registration response message is used to determine that registration is completed.

The network repository network element is configured to: receive the registration request message from the first session management network element; store a correspondence between the identifier of the first session management network element and the DNAI supported by the first session management network element; and send the registration response message to the first session management network element.

Figure 2A:
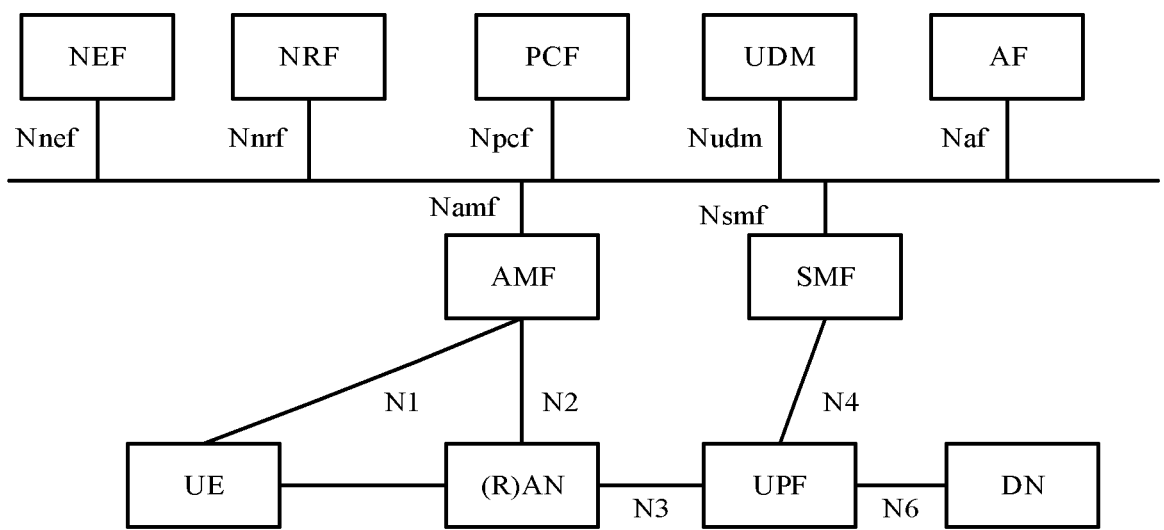
FIG. 2A is a schematic diagram of a 5G network architecture based on a service-oriented architecture.

FIG. 2A is a schematic diagram of a 5G network architecture based on a service-oriented architecture. The 5G network architecture shown in FIG. 2A may include three parts: a terminal device, a data network (DN), and a carrier network. The following briefly describes functions of some network elements.

The carrier network may include one or more of the following network elements: a network exposure function (NEF) network element, a policy control function (PCF) network element, a unified data management (UDM) network element, a network repository function (NRF) network element, an application function (AF) network element, an access and mobility management function (AMF) network element, a session management function (SMF) network element, a (radio) access network ((R)AN), a user plane function (UPF) network element, and the like. In the foregoing carrier network, parts other than the (radio) access network may be referred to as core network parts. For ease of description, an example in which the (R)AN is referred to as a RAN is used below for description.

The terminal device may also be referred to as a user equipment (UE), and it is a device that has a wireless transceiver function, and may be deployed on land, for example, an indoor device, an outdoor device, a handheld device, or a vehicle-mounted device; or may be deployed on water (for example, on a steamship); or may be deployed in the air (for example, on an airplane, a balloon, or a satellite). The terminal device may be a mobile phone, a tablet computer (pad), a computer that has a wireless transceiver function, a virtual reality (VR) terminal, an augmented reality (AR) terminal, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like.

The terminal device may establish a connection to the carrier network through an interface (for example, N1) provided by the carrier network, and use services such as a data service and/or a voice service provided by the carrier network. The terminal device may further access the DN through the carrier network, and use a carrier service deployed on the DN and/or a service provided by a third party. The third party may be a service provider other than the carrier network and the terminal device, and may provide services such as a data service and/or a voice service to the terminal device. A representation form of the third party may be determined based on an actual application scenario, and is not limited herein.

The RAN is a sub-network of the carrier network, and is an implementation system between a service node in the carrier network and the terminal device. To access the carrier network, the terminal device first passes through the RAN, and may be connected to the service node of the carrier network through the RAN. A RAN device in this application is a device that provides a wireless communication function for a terminal device. The RAN device is also referred to as an access network device. The RAN device in this application includes but is not limited to: a next generation NodeB (gNB), an evolved NodeB (eNB), a radio network controller (RNC), a NodeB (NB), a base station controller (BSC), a base transceiver station (BTS), a home NodeB (for example, a home evolved NodeB or a home NodeB (HNB)), a baseband unit (BBU), a transmission reception point (TRP), a transmitting point (TP), a mobile switching center, and the like in 5G.

The AMF network element is a control plane network element provided by the carrier network, and is responsible for access control and mobility management when the terminal device accesses the carrier network, for example, including functions such as mobility status management, allocation of a temporary user identity, and user authentication and authorization.

The SMF network element is a control plane network element provided by the carrier network, and is responsible for managing a PDU session of the terminal device. The PDU session is a channel used for transmitting a PDU, and the terminal device and the DN needs to send a PDU to each other via the PDU session. The SMF network element is responsible for establishment, maintenance, deletion, and the like of the PDU session. The SMF network element includes session-related functions such as session management (for example, session establishment, modification, and release, including tunnel maintenance between the UPF and the AN), selection and control of the UPF network element, service and session continuity (SSC) mode selection, and roaming.

The UPF network element is a gateway provided by a carrier, and is a gateway for communication between the carrier network and the DN. The UPF network element includes user plane-related functions such as data packet routing and transmission, packet detection, service usage reporting, quality of service (QoS) processing, lawful interception, uplink packet detection, and downlink data packet storage.

The DN is a network located outside the carrier network. The carrier network may access a plurality of DNs. A plurality of services may be deployed on the DN, to provide a service such as data and/or voice for the terminal device. For example, the DN is a private network of a smart factory, a sensor installed in a workshop of the smart factory may be a terminal device, a control server of the sensor is deployed in the DN, and the control server may provide a service to the sensor. The sensor may communicate with the control server, to obtain instructions of the control server, transmit collected sensor data to the control server according to the instructions, and the like. For another example, the DN is an internal office network of a company, a mobile phone or a computer of an employee of the company may be a terminal device, and the mobile phone or the computer of the employee may access information, data resources, and the like on the internal office network of the company.

The UDM network element is a control plane network element provided by the carrier, and is responsible for storing information such as a subscription permanent identifier (SUPI), a credential, a security context, and subscription data of a subscriber in the carrier network. The information stored in the UDM network element may be used for authentication and authorization when the terminal device accesses the carrier network. The subscriber in the operator network may be a user using a service provided by the operator network, for example, a user using a subscriber identification module card of China Telecom, or a user using a subscriber identification module card of China Mobile. The SUPI of the subscriber may be a number of the subscriber identification module card, and the like. The credential and the security context of the subscriber may be stored small files such as an encryption key of the subscriber identification module card or information related to encryption of the subscriber identification module card, and are used for authentication and/or authorization. The security context may be cookie, a token, or the like stored in a local terminal (for example, a mobile phone) of the user. The subscription data of the subscriber may be a supporting service of the subscriber identification module card, for example, a data package or available network of the subscriber identification module card. It should be noted that the permanent identifier, the credential, the security context, authentication cookie, and the token are equivalent to information related to authentication and authorization, and are not limited or distinguished between each other for ease of description in this application document of the present disclosure. Unless otherwise specified, the security context is used as an example for description in this embodiment of this application. However, this embodiment of this application is also applicable to authentication and/or authorization information described in another manner.

The NEF network element is a control plane network element provided by the carrier. The NEF network element securely exposes an external interface of the carrier network to the third party. When the SMF network element needs to communicate with a third-party network element, the NEF network element may serve as a relay for communication between the SMF network element and the third-party network element. When the NEF network element serves as the relay, the NEF network element may translate identification information of the subscriber and identification information of the third-party network element. For example, when the NEF sends the SUPI of the subscriber from the carrier network to the third party, the NEF may translate the SUPI into an external identity (ID) corresponding to the SUPI. When the NEF network element sends the external ID (an ID of the third-party network element) to the carrier network, the NEF network element may translate the external ID into the SUPI.

The application function (AF) network element mainly provides an application-layer service and further supports interaction with a 5G core network to provide a service, for example, affecting a data routing decision, providing a policy control function, or providing some third-party services for a network side. In this application, the AF network element includes an application server. The application server indicates a third-party server.

The PCF network element is a control plane function provided by the carrier, and is configured to provide a policy for a network element. In an implementation, the policy may include an access control policy, a mobility management policy, a charging-related policy, a QoS-related policy, an authorization-related policy, and the like.

The NRF network element may be configured to: provide a network element discovery function, and provide network element information corresponding to a network element type based on a request of another network element. The NRF further provides a network element management service, for example, network element registration, update, de-registration, and network element status subscription and push.

In FIG. 2A, Nnef, Npcf, Nudm, Naf, Namf, Nsmf, N1, N2, N3, N4, and N6 are interface serial numbers. For meanings of these interface sequence numbers, refer to meanings defined in the 3rd Generation Partnership Project (3GPP) standard protocol. This is not limited herein.

Figure 2B:
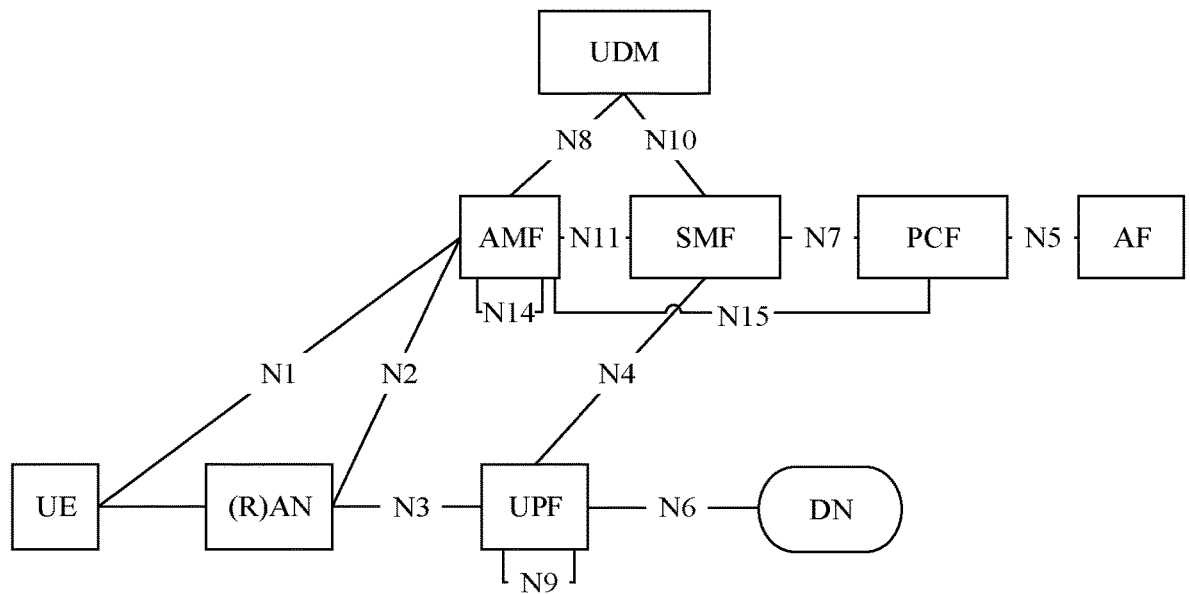
FIG. 2B is a schematic diagram of a 5G network architecture based on a point-to-point interface.

FIG. 2B is a schematic diagram of a 5G network architecture based on a point-to-point interface. For descriptions of functions of a network element, refer to the descriptions of functions of a corresponding network element in FIG. 2A. Details are not described again. A main difference between FIG. 2B and FIG. 2A is that an interface between network elements in FIG. 2B is a point-to-point interface rather than a service-based interface.

In the architecture shown in FIG. 2B, an interface between UE and the AMF network element is referred to as an N1 interface. An interface between the AMF network element and the RAN device is referred to as an N2 interface. An interface between the RAN device and the UPF network element may be referred to as an N3 interface. An interface between the SMF network element and the UPF network element is referred to as an N4 interface. An interface between the PCF network element and the AF network element is referred to as an N5 interface. An interface between the UPF network element and the DN is referred to as an N6 interface. An interface between the SMF network element and the PCF network element is referred to as an N7 interface. An interface between the AMF network element and the UDM network element is referred to as an N8 interface. An interface between different UPF network elements is referred to as an N9 interface. An interface between the UDM network element and the SMF network element is referred to as an N10 interface. An interface between the AMF network element and the SMF network element is referred to as an N11 interface. An interface between different AMF network elements is referred to as an N14 interface. An interface between the AMF network element and the PCF network element is referred to as an N15 interface.

It may be understood that the network elements or the functions may be network elements in a hardware device, software functions running on dedicated hardware, or virtualized functions instantiated on a platform (for example, a cloud platform). Optionally, the foregoing network elements or functions may be implemented by one device, or may be jointly implemented by a plurality of devices, or may be one function module in one device. This is not specifically limited in the embodiments of this application.

In this application, a mobility management network element, a session management network element, a policy control network element, an application function network element, an access network device, and a network repository network element may be the AMF, the SMF, the PCF, the AF, the RAN, and the NRF in FIG. 2A or FIG. 2B; or may be network elements that have functions of the AMF, the SMF, the PCF, the AF, the RAN, and the NRF in a future communications network such as a 6th generation (6G) network. This is not limited in this application. For ease of description, an example in which the mobility management network element, the session management network element, the policy control network element, the application function network element, the access network device, and the network repository network element are respectively the AMF, the SMF, the PCF, the AF, the RAN, and the NRF is used in this application for description. In addition, in this application, the terminal device is briefly referred to as UE.

For different data networks accessed by the UE, the network may select, as a PDU session anchor (PSA) according to a network policy, a UPF accessing the data network, and access the AF using the N6 interface of the PSA. AFs of the same application may be deployed at a plurality of locations, such that the network can select, based on an access location of the UE, a PSA that is near the UE and that supports the UE in accessing the data network, to reduce an alternative route and reduce a network delay.

In an application access process, the access location of the UE changes. To reduce an alternative route, the PSA needs to perform reselection, to facilitate accessing a nearby application. In the conventional technologies, a method for reselecting a PSA is as follows: The AF sends a request message to the SMF. The request message includes a data network access identifier (DNAI). The DNAI is used to identify local access of the data network. Then, the SMF selects, as the PSA, a UPF that supports the DNAI in the request message.

However, for network configuration reasons, in some scenarios, the UPF managed by the SMF may not support all or most of accessible DNAIs of the UE, and consequently, cannot select a proper PSA for the UE to facilitate the UE to access the nearby AF.

To resolve the technical problem mentioned in the background and resolve the foregoing technical problem of selecting a proper PSA for the UE, based on the architecture shown above, with reference to FIG. 3, this application provides a method for selecting an SMF. The method includes the following steps.

Step 301: The AMF determines a first DNAI corresponding to a first session of the UE.

Step 302: The AMF selects, for the first session of the UE, a first SMF that supports all or a part of DNAIs in the first DNAI.

It should be noted that if currently there is already an SMF that provides a service for the UE, the selected first SMF is a newly added SMF, and therefore, may be referred to as a first I-SMF. For the same reason, a second SMF, a third SMF, and a fourth SMF that subsequently appear may be respectively referred to as a second I-SMF, a third I-SMF, and a fourth I-SMF. Herein, the I-SMF is the acronym of the intermediate SMF.

It should be noted that the DNAI in this application may be considered as location information of a data access network. For example, in a scenario, because of load balancing, the AF may request a data routing access point to be at a specific location (where the application deploys the AF at the location). To be more specific, the AF expects a data flow of the application of a user to connect to the AF at the location.

Based on the foregoing solution, the AMF selects the SMF for the UE, and the SMF supports all or a part of the DNAIs in the first DNAI. Therefore, the UPF selected by the SMF also supports all or a part of the DNAIs in the first DNAI. In other words, the SMF is responsible for managing the UPF that support all or a part of the DNAIs in the first DNAI corresponding to the first session, such that a proper SMF is selected for the UE. Further, using the selected SMF, the UPF that supports the DNAI corresponding to the first session may be selected as the PSA for the UE, to reduce an alternative route and reduce a network delay.

Figure 3:
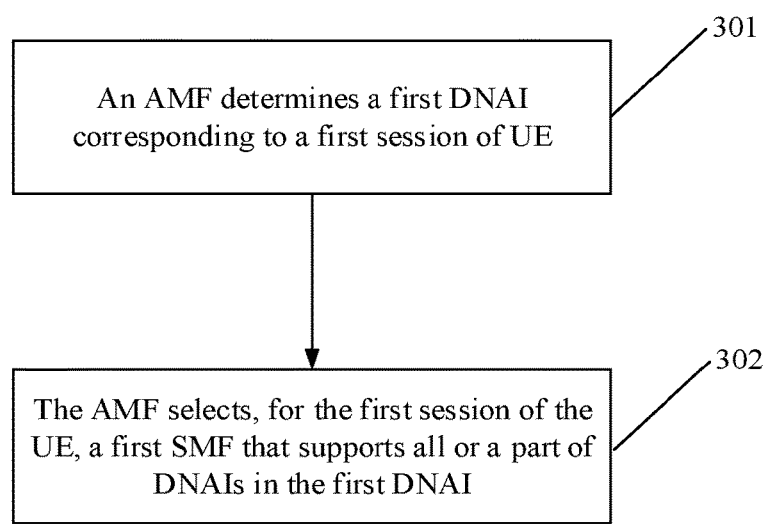
FIG. 3 is a schematic flowchart of a method for selecting a session management function (SMF) according to this application.

For example, the following provides different implementation methods of the embodiment in FIG. 3.

Implementation method 1: In a registration process of the UE, the AMF obtains DNAI information related to the UE. In a session establishment process of the UE, the AMF selects the first SMF for the UE.

In the implementation method 1, in the registration process of the UE, that the AMF obtains the DNAI information related to the UE may be, for example, that the AMF obtains the first information in the registration process of the UE. The first information is the DNAI information related to the UE. The first information includes an identifier of a session of the UE and a second DNAI corresponding to the identifier of the session of the UE. The second DNAI is one or more DNAIs. The identifier of the session of the UE includes an identifier of the first session.

The first information herein includes one or more correspondences. Each correspondence indicates a correspondence between the identifier of the session of the UE and at least one DNAI (that is, the second DNAI). In other words, the first information includes identifiers of one or more sessions. An identifier of each session corresponds to one second DNAI. The second DNAI indicates one or more DNAIs. The identifiers of the one or more sessions in the first information include the identifier of the first session. Therefore, the second DNAI corresponding to the identifier of the first session in the first information is the first DNAI. Alternatively, it is understood that the first DNAI is the second DNAI corresponding to the identifier of the first session in the first information.

With reference to Table 1, an example of the first information is provided. For example, an identifier of a session includes a DNN and single network slice selection assistance information (S-NSSAI). Each row represents a correspondence.

TABLE 1

| Session identifier | DNAI |
| --- | --- |
| DNN 1, S-NSSAI 1 | DNAI 1, DNAI 2 |
| DNN 1, S-NSSAI 2 | DNAI 1, DNAI 3 |
| DNN 2, S-NSSAI 1 | DNAI 2, DNAI 4 |
| ... | ... |

An implementation method may include the following.

In the registration process of the UE, the AMF may obtain the first information from the PCF, or may obtain the first information from another AMF (for example, an AMF that provides a service for the UE before the UE moves).

An implementation method may include the following.

After the UE is registered to the network, the AMF may obtain the identifier of the first session in the session establishment process. For example, the AMF may receive a request message from the UE. The request message includes the identifier of the first session. The request message is used to request to establish the first session. Alternatively, the AMF receives context information of the UE from another AMF (for example, an AMF that provides a service for the UE before the UE moves). The context information includes the identifier of the first session.

After obtaining the identifier of the first session, the AMF may determine, based on the identifier of the first session and the first information, the first DNAI corresponding to the first session. For example, the identifier of the first session is the DNN 1 and the S-NSSAI 1 in Table 1. In this case, the AMF may obtain, based on Table 1, the DNAI 1 and the DNAI 2 included in the first DNAI corresponding to the identifier of the first session. Further, the AMF may select, for the UE, an SMF that supports the DNAI 1 and the DNAI 2. For example, if there is an SMF that supports both the DNAI 1 and the DNAI 2, the SMF is selected as the first SMF. Certainly, if there is no SMF that supports both the DNAI 1 and the DNAI 2, an SMF that supports the DNAI 1 or the DNAI 2 may be selected as the first SMF for the UE.

An implementation method may include the following.

After the SMF is selected for the UE, the SMF may select the UPF for the UE. Because the first SMF supports all or a part of the DNAIs in the first DNAI, the selected UPF also supports all or a part of the DNAIs in the first DNAI, such that the UPF selected for the UE can serve as the PSA.

Based on the implementation method 1, if the DNAI information related to the UE is subsequently updated, the PCF may further indicate the AMF to update. For example, the PCF may send second information to the AMF. The second information is DNAI information related to the UE. The second information includes the identifier of the session of the UE and at least one DNAI corresponding to the identifier of the session of the UE. The second information includes the identifier of the first session and the third DNAI corresponding to the identifier of the first session.

The second information may be indicated to the AMF in a full update manner or an incremental update manner. During full update, the AMF may replace the first information with the second information. Alternatively, it is understood that the AMF deletes the first information and stores the second information as newest DNAI information. During incremental update, the AMF combines the first information and the second information. Alternatively, it is understood that the AMF performs deduplication on the first information and the second information for storage. Therefore, the stored DNAI information includes both the first information and the second information. The following separately describes the two different update manners.

Update manner 1: the full update manner.

With reference to the example in Table 1, in an implementation, the second information sent by the PCF to the AMF includes the newest DNAI information. The newest DNAI information may be obtained through newly adding one or more correspondences between the identifier of the session and the DNAI based on the first information (with reference to an example in Table 2), or may be obtained through modifying the first information (with reference to an example in Table 3), or may be obtained through performing newly addition and modification based on the first information (with reference to an example in Table 4).

TABLE 2

| Session identifier | DNAI |
| --- | --- |
| DNN 1, S-NSSAI 1 | DNAI 1, DNAI 2 |
| DNN 1, S-NSSAI 2 | DNAI 1, DNAI 3 |
| DNN 2, S-NSSAI 1 | DNAI 2, DNAI 4 |
| DNN 2, S-NSSAI 3 | DNAI 2, DNAI 3, DNAI 4 |
| DNN 1, S-NSSAI 3 | DNAI 3, DNAI 4 |
| ... | ... |

With reference to Table 2, it may be learned that in the second information, the DNAI corresponding to the identifier of the first session does not change and is still the DNAI 1 and the DNAI 2. Therefore, the third DNAI corresponding to the first session in the second information is the same as the first DNAI corresponding to the first session in the first information.

TABLE 3

| Session identifier | DNAI |
| --- | --- |
| DNN 1, S-NSSAI 1 | DNAI 1, DNAI 4 |
| DNN 1, S-NSSAI 2 | DNAI 1, DNAI 3 |
| DNN 2, S-NSSAI 1 | DNAI 2, DNAI 4 |
| ... | ... |

With reference to Table 3, it may be learned that in the second information, the DNAI corresponding to the identifier of the first session changes. The DNAI 1 and the DNAI 2 are updated to the DNAI 1 and the DNAI 4. Therefore, the third DNAI corresponding to the first session in the second information is different from the first DNAI corresponding to the first session in the first information.

TABLE 4

| Session identifier | DNAI |
| --- | --- |
| DNN 1, S-NSSAI 1 | DNAI 1, DNAI 4 |
| DNN 1, S-NSSAI 2 | DNAI 1, DNAI 3 |
| DNN 2, S-NSSAI 1 | DNAI 2, DNAI 4 |
| DNN 2, S-NSSAI 3 | DNAI 2, DNAI 3, DNAI 4 |
| DNN 1, S-NSSAI 3 | DNAI 3, DNAI 4 |
| ... | ... |

With reference to Table 4, it may be learned that in the second information, the DNAI corresponding to the identifier of the first session changes. The DNAI 1 and the DNAI 2 are updated to the DNAI 1 and the DNAI 4. Therefore, the third DNAI corresponding to the first session in the second information is different from the first DNAI corresponding to the first session in the first information.

Based on any implementation method of the second information, after obtaining the second information, the AMF may determine the fourth DNAI based on the third DNAI corresponding to the first session in the second information. The fourth DNAI is the same as the third DNAI. The fourth DNAI indicates a newest DNAI corresponding to the first session. For example, in Table 2, the fourth DNAI includes the DNAI 1 and the DNAI 2. In Table 3 and Table 4, the fourth DNAI includes the DNAI 1 and the DNAI 4.

Update manner 2: the incremental update manner.

In an implementation, the second information sent by the PCF to the AMF may be DNAI information newly added based on the first information.

With reference to Table 1, Table 5 provides an example of the update manner.

TABLE 5

| Session identifier | DNAI |
| --- | --- |
| DNN 1, S-NSSAI 1 | DNAI 4 |
| DNN 1, S-NSSAI 2 | DNAI 2 |
| DNN 1, S-NSSAI 3 | DNAI 3, DNAI 4 |
| ... | ... |

With reference to Table 5, it may be learned that in the second information, the third DNAI corresponding to the first session includes the DNAI 4. In other words, the DNAI 4 is newly added to the DNAI corresponding to the first session.

Based on the implementation method of the second information, after obtaining the second information, the AMF may determine the fourth DNAI based on the third DNAI corresponding to the first session in the second information and the first DNAI corresponding to the first session in the first information. The fourth DNAI includes the first DNAI and the third DNAI. The fourth DNAI indicates a newest DNAI corresponding to the first session. For example, with reference to Table 1 and Table 5, it may be determined that the fourth DNAI corresponding to the first session includes the DNAI 1, the DNAI 2, and the DNAI 4.

After obtaining, in the full update manner or the incremental update manner, the newest DNAI corresponding to the first session, that is, the fourth DNAI, the AMF may select, for the first session of the UE, a second SMF that supports all or a part of DNAIs in the fourth DNAI. If the second SMF is different from the first SMF, the second SMF serves as a newest SMF. If the second SMF is the same as the first SMF, no update is needed.

Implementation method 2: In the session establishment process of the UE, the AMF first selects an SMF (referred to as a third SMF); and then, the AMF obtains DNAI information related to the session of the UE, and reselects the first SMF for the UE based on the DNAI information.

In the implementation method 2, in the session establishment process of the UE, the AMF selects the third SMF. For example, in the session establishment process of the UE, the AMF may select the third SMF for the first session of the UE based on location information of the UE. Certainly, the third SMF may alternatively be selected in another manner. A method for selecting the third SMF by the AMF is not limited in this application.

After selecting the third SMF, the AMF may subsequently obtain the DNAI information related to the session of the UE. For example, in a process of establishing the first session, the UE obtains, from the PCF or another AMF (for example, an AMF that provides a service for the UE before the UE moves), the DNAI information related to the first session, that is, the first DNAI corresponding to the first session. Therefore, if determining that the third SMF does not support all or a part of the DNAIs in the first DNAI, the AMF selects, for the first session, the first SMF that supports all or a part of the DNAIs in the first DNAI.

Based on the implementation method 2, the AMF may first select the third SMF for the UE without considering the DNAI. When determining that the third SMF does not support all or a part of the DNAIs in the first DNAI corresponding to the first session, the AMF reselects, for the UE, an SMF that supports all or a part of the DNAIs in the first DNAI corresponding to the first session, that is, the first SMF.

Based on the implementation method 1 or the implementation method 2, in a subsequent modification process of the first session of the UE, if the DNAI corresponding to the first session changes, for example, the newest DNAI corresponding to the first session is a fifth DNAI, the PCF may send, to the AMF in the session update process, the fifth DNAI corresponding to the first session; and then the AMF determines a sixth DNAI based on the fifth DNAI. The sixth DNAI is the newest DNAI corresponding to the first session. If the update is performed in the full update manner, the sixth DNAI is the same as the fifth DNAI. If the update is performed in the incremental update manner, the sixth DNAI includes the first DNAI and the fifth DNAI. Further, the fourth SMF that supports all or a part of DNAIs in the sixth DNAI may be selected for the first session of the UE. If the fourth SMF is different from the current SMF (that is, the first SMF or the second SMF), the second SMF serves as the newest SMF. If the fourth SMF is the same as the current SMF, no update is needed.

It should be noted that a difference between the two manners of sending the updated DNAI information to the AMF by the PCF is as follows: In a first manner (that is, based on the method for sending the updated DNAI information described in the implementation method 1), the PCF sends, to the AMF, the DNAI information (that is, the second information) that is related to the session of the UE and that is in a granularity of the UE. The second information includes not only the identifier of the first session and the DNAI corresponding to the identifier of the first session, but also an identifier of another session of the UE and a corresponding DNAI. In a second manner (that is, based on the method for sending the updated DNAI information described in the implementation method 2), in a session modification process, the PCF sends, to the AMF, only a newest DNAI corresponding to the first session, and does not need to send neither the identifier of the first session nor an identifier of another session of the UE or a corresponding DNAI.

The following describes in detail the embodiment shown in FIG. 3 with reference to FIG. 4A and FIG. 4B to FIG. 7. In the following embodiments of this application, a new AMF indicates an AMF that currently provides a service for the UE, an old AMF indicates an AMF that previously provides a service for the UE, and the old AMF may store context information of the UE. For example, when registration is initiated again because of a movement of the UE, the new AMF indicates an AMF that provides a service for the UE when the UE is at a location after the movement, and the old AMF indicates an AMF that provides a service for the UE when the UE is at a location before the movement. It should be noted that the new AMF may also be referred to as a new AMF, and the old AMF may also be referred to as an old AMF or an original AMF.

The PCF is classified into an access and mobility (AM)-PCF and a session management (SM)-PCF. The AM-PCF is configured to: provide an access control and mobility management policy for the AMF, and provide a UE policy for the UE. The SM-PCF is configured to provide a session management-related policy for the SMF. In implementation, the AM-PCF and the SM-PCF may be deployed together on the same physical device, or may be deployed separately on different physical devices. This is not limited in this application.

Figure 4A:
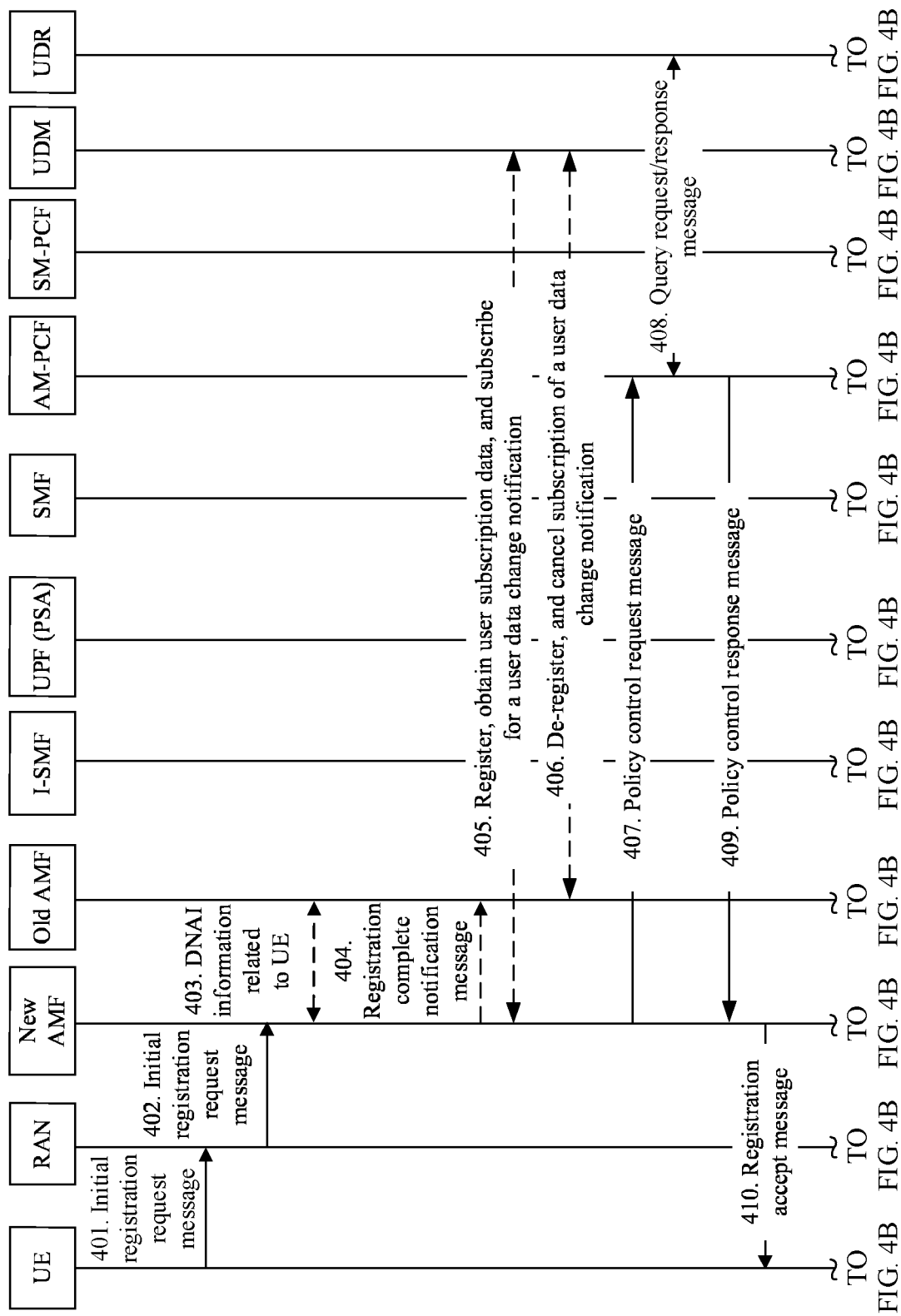
FIG. 4A and FIG. 4B are a schematic flowchart of another method for selecting an SMF according to this application.
Figure 4B:
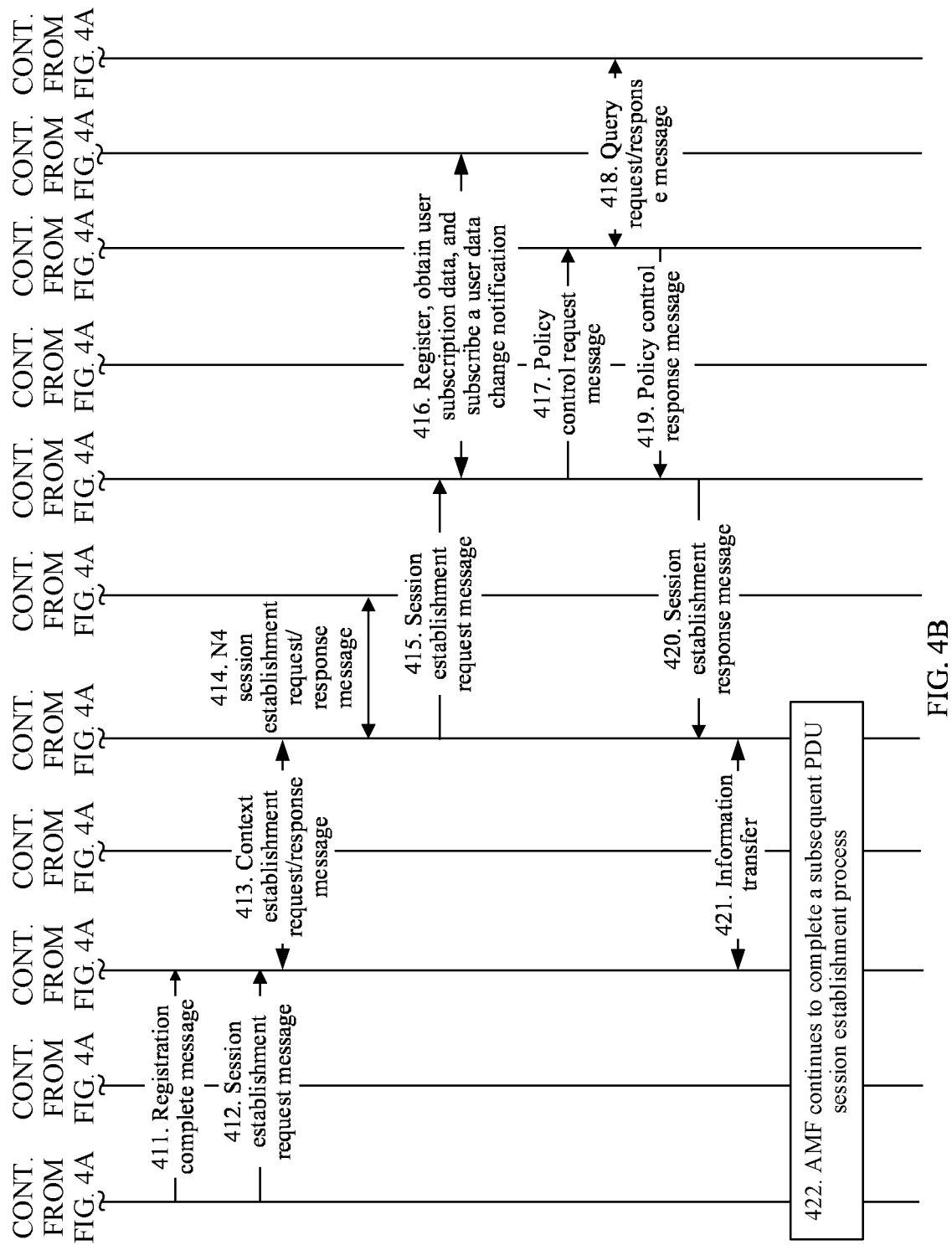

With reference to FIG. 4A and FIG. 4B, this application provides another method for selecting an SMF. Based on the method, in a registration process of the UE, the new AMF receives DNAI information related to the UE from the PCF or the old AMF. In a PDU session establishment process, the new AMF selects an I-SMF based on a DNAI corresponding to an established session in the DNAI information.

The method includes the following steps.

Step 401: The UE sends an initial registration request message to the RAN. The message carries an identifier (for example, a temporary identifier) of the UE. Correspondingly, the RAN may receive the initial registration request message.

Step 402: The RAN sends an initial registration request message to the new AMF. The message carries the identifier (for example, a temporary identifier) of the UE. Correspondingly, the new AMF may receive the initial registration request message.

Step 403: If the initial registration request message carries the temporary identifier, the new AMF obtains a context of the UE from the old AMF. If the context of the UE includes DNAI information related to the UE, the old AMF sends the DNAI information to the new AMF.

The DNAI information herein includes one or more correspondences. Each correspondence indicates a correspondence between the identifier of the session and at least one DNAI.

Herein, the DNAI information related to the UE is the first information in the foregoing embodiment.

In an implementation of step 403, the new AMF may send Naf_Communication_UEContextTransferrequest to the old AMF, and then the old AMF sends Naf_Communication-_UEContextTransferresponse to the new AMF. Herein, Naf-_Communication_UEContextTransferrequest carries the context of the UE. The context of the UE includes the DNAI information related to the UE.

Step 403 is optional.

Step 404: The new AMF sends a registration complete notification message to the old AMF. Correspondingly, the old AMF may receive the registration complete notification message.

Step 404 is optional.

Step 405: The new AMF registers with a UDM to obtain user subscription data, and subscribes for a user data change notification.

Step 405 is optional.

Step 406: The old AMF de-registers with the UDM, and cancels subscription of a subscription data change notification.

Step 406 is optional.

Step 407: The new AMF sends a policy control request message to the AM-PCF. The message carries a SUPI and an internal group identifier list to which the UE belongs. Correspondingly, the AM-PCF may receive the policy control request message.

In an implementation method, the policy control request message may be an Npcf_AMPolicyControl_Create Request message.

Step 408: The AM-PCF interacts with a UDR to obtain subscription information of the UE and related information about an AF-influenced traffic steering decision from the UDR. The information includes the DNAI information related to the UE.

In implementation, the AM-PCF may send a query request message to the UDR, and then the UDR sends a query response message to the AM-PCF. The query response message includes the DNAI information related to the UE, and may further include the subscription information of the UE.

The query request message may be an NUdr_DM_Query Request message. The query response message may be an NUdr_DM_Query Response message.

Herein, the DNAI information related to the UE is the same as that in the descriptions of the DNAI information related to the UE in step 403. For details, refer to the foregoing descriptions.

It should be noted that, if the DNAI information related to the UE can be obtained through step 403, the DNAI information related to the UE may not need to be obtained in step 408. If the DNAI information related to the UE cannot be obtained through step 403, the DNAI information related to the UE may be obtained in step 408.

Step 409: The AM-PCF sends a policy control response message to the new AMF. Correspondingly, the new AMF may receive the policy control response message.

Optionally, the policy control response message includes the DNAI information related to the UE.

In an implementation method, the policy control response message may be an Npcf_AMPolicyControl_Create Response message.

Step 410: The new AMF sends a registration accept message to the UE. Correspondingly, the UE may receive the registration accept message.

Step 411: The UE sends a registration complete message to the new AMF using a RAN. Correspondingly, the new AMF may receive the registration complete message.

Using step 401 to step 411, in the registration process of the UE, the UE may obtain, from the old AMF or the AM-PCF, the DNAI information related to the UE. The DNAI information is in a granularity of the UE.

The following describes the PDU session establishment process of the UE. In the PDU session establishment process, an I-SMF that supports the DNAI is selected for the UE.

Step 412: The UE sends a session establishment request message to the new AMF. The message is used to request to establish a PDU session. Correspondingly, the new AMF may receive the session establishment request message.

Optionally, the session establishment request message carries an identifier of the first session. The identifier of the first session may include a DNN and S-NSSAI.

Step 413: The new AMF determines based on a current location of the UE that an I-SMF needs to be inserted, selects an I-SMF, and sends a context establishment request message to the selected I-SMF. Then, the I-SMF sends a context establishment response message to the new AMF.

Herein, the context establishment request message may be, for example, an Nsmf_PDUSession_CreateSMContext Request message, and the context establishment response message may be, for example, an Nsmf_PDUSession_CreateSMContext Response message.

Optionally, the new AMF determines, based on the identifier of the first session of the UE and the obtained DNAI information, a first DNAI corresponding to the first session, and then selects, as the I-SMF, an SMF that supports all or a part of DNAIs in the first DNAI.

For example, the identifier of the first session in the session establishment request message in step 412 is a DNN 1 and S-NSSAI 2. The new AMF obtains the DNAI information related to the UE from the old AMF or the AM-PCF. The foregoing Table 1 is used as an example. The new AMF may determine that a DNAI corresponding to the DNN 1 and the S-NSSAI 2 includes a DNAI 1 and a DNAI 3. Then, the new AMF selects, as the I-SMF, an SMF that supports the DNAI 1 and/or the DNAI 3.

For example, if there is an SMF that supports the DNAI 1 and the DNAI 3, the SMF may serve as the I-SMF. Alternatively, if there is no SMF that supports both the DNAI 1 and the DNAI 3, an SMF that supports the DNAI 1 or the DNAI 3 may be selected as the I-SMF.

Through preconfiguration or through querying using the NRF, the new AMF may learn of a specific SMF that supports the DNAI corresponding to the session. In other words, a DNAI supported by one or more SMFs managed by the new AMF is preconfigured on the new AMF. Alternatively, the NRF stores a DNAI separately supported by one or more SMFs managed by the new AMF and another AMF.

Step 414: The I-SMF selects a UPF, and sends an N4 session establishment request message to the UPF. The UPF returns an N4 session establishment response message to the I-SMF.

The UPF herein is the UPF serving as the PSA. The UPF also supports the DNAI corresponding to the session, to select, for the session of the UE, a PSA that supports the DNAI corresponding to the session.

Step 415: The I-SMF sends a session establishment request message to the SMF. Correspondingly, the SMF may receive the session establishment request message.

The session establishment request message may be, for example, an Nsmf_PDUSession_Create Request message.

Step 416: The SMF registers with the UDM to obtain the user subscription data, and subscribes for the user data change notification.

Step 417: The SMF sends a policy control request message to an SM-PCF. Correspondingly, the SM-PCF may receive the policy control request message.

The policy control request message may be, for example, an Npcf_SMPolicyControl_Create Request message.

Step 418: The SM-PCF interacts with the UDR, and obtains policy subscription information of a user.

In implementation, the SM-PCF may send a query request message to the UDR, and then the UDR sends a query response message to the SM-PCF. The query response message includes the policy subscription information of the user.

The query request message may be a NUdr_DM_Query Request message. The query response message may be a NUdr_DM_Query Response message.

Step 419: The SM-PCF sends a policy control response message to the SMF after executing a policy. Correspondingly, the SMF may receive the policy control response message.

The policy control response message may be, for example, an Npcf_SMPolicyControl_Create Response message.

Step 420: The SMF sends a session establishment response message to the I-SMF. Correspondingly, the SMF may receive the session establishment response message.

The session establishment response message may be, for example, an Nsmf_PDUSession_Create Response message.

Step 421: The I-SMF sends an information transfer message to the AMF, and the AMF returns an information transfer response message to the I-SMF.

The information transfer message may be, for example, a Namf_Communication_N1N2MessageTransfer message.

Step 422: The AMF continues to complete the subsequent PDU session establishment process.

Based on the foregoing embodiment, the AMF obtains the DNAI information related to the UE from the PCF (for example, the AM-PCF) or another AMF (for example, the old AMF); in the PDU session establishment process of the UE, determines the first DNAI corresponding to the established PDU session based on the identifier of the session; and then, selects the I-SMF that supports all or a part of the DNAIs in the first DNAI. Then, the I-SMF selects the UPF. Because the I-SMF supports the first DNAI, the selected UPF also supports the first DNAI. Therefore, the UPF may serve as the PSA, to select a proper PSA for the UE, that is, select a PSA that supports the DNAI corresponding to the session.

In an implementation method, after the procedure in FIG. 4A and FIG. 4B is executed, a movement of the UE causes switching of the first session in AMF reselection. A target AMF obtains the DNAI information related to the UE and the identifier of the first session from a source AMF. The target AMF determines the first DNAI corresponding to the identifier of the first session, and then selects, as the I-SMF, the SMF that supports all or a part of the DNAIs in the first DNAI. Alternatively, the target AMF obtains the first DNAI corresponding to the first session from the source AMF, and then selects, as the I-SMF, the SMF that supports all or a part of the DNAIs in the first DNAI.

Figure 5:
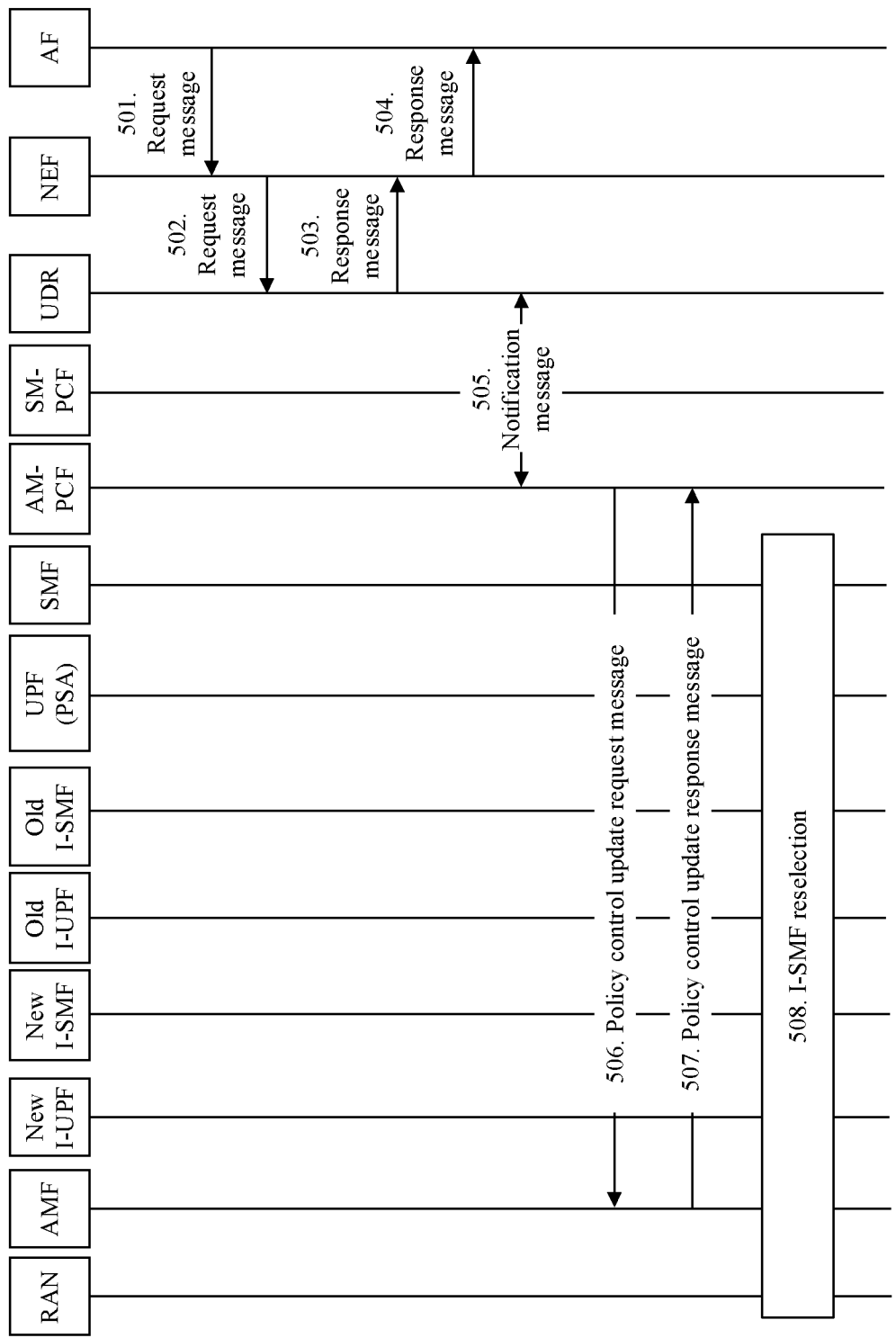
FIG. 5 is a schematic flowchart of another method for selecting an SMF according to this application.

With reference to FIG. 5, this application provides another method for selecting an SMF. The method may be combined with the embodiment shown in FIG. 4A and FIG. 4B. The following needs to be met: Step 501 to step 505 may be performed at any moment, and step 506 to step 508 are performed after step 422.

In this embodiment, in the registration process of the UE, the AMF obtains the DNAI information related to the UE. Then, in a session process, the AMF obtains the updated DNAI information from the AM-PCF, and may further reselect an I-SMF (that is, a new I-SMF in FIG. 5) based on the updated DNAI information. An old I-SMF in this embodiment may be the I-SMF in the embodiment of FIG. 4A and FIG. 4B.

The method includes the following steps.

Step 501: An AF sends a request message to an NEF. Correspondingly, the NEF may receive the request message.

The request message carries traffic steering information. The traffic steering information may carry an external group identifier or indication information. The external group identifier is used to indicate that the traffic steering information is applicable to one or more UEs corresponding to the external group identifier. The indication information is used to indicate that the traffic steering information is applicable to all UEs.

The traffic steering information further carries DNAI information. The DNAI information includes one or more correspondences. Each correspondence is a correspondence between an identifier of a session of the UE and at least one DNAI.

The request message may be, for example, an Nnef_TrafficInfluence_Create Request message.

Step 502: The NEF sends a request message to the UDR. The request message carries the traffic steering information. Correspondingly, the UDR may receive the request message.

For example, the request message may be, for example, an Nudr_DataRepository_Create Request message.

It should be noted that if the traffic steering information carries the external group identifier, the NEF further needs to map the external group identifier into an internal group identifier. In other words, the traffic steering information sent by the NEF to the UDR carries the internal group identifier and the DNAI information.

If the traffic steering information carries the indication information, the traffic steering information sent by the NEF to the UDR carries the indication information and the DNAI information.

Step 503: The UDR stores the DNAI information, and returns a response message to the NEF. Correspondingly, the NEF may receive the response message.

The response message may be, for example, a Nudr_DataRepository_Create Response message.

If the traffic steering information carries the internal group identifier, the UDR stores a correspondence between the internal group identifier and the DNAI information. Alternatively, the UDR first determines, based on the internal group identifier, an identifier of the UE corresponding to the internal group identifier, and then stores a correspondence between the identifier of the UE and the DNAI information.

If the traffic steering information carries the indication information, the UDR stores the DNAI information without being associated with the UE, to indicate that the DNAI information is applicable to all the UEs.

Step 504: The NEF sends a response message to the AF. Correspondingly, the AF may receive the response message.

The response message may be, for example, an Nnef_TrafficInfluence_Create Response message.

Step 504 is optional.

Step 505: The UDR sends a notification message to all subscriber AM-PCFs. The notification message carries the traffic steering information. Correspondingly, the AM-PCF may receive the notification message.

Step 506: The AM-PCF sends a policy control update request message to the AMF. The message carries the DNAI information. Correspondingly, the AMF may receive the policy control update request message.

The DNAI information carried in the message is the second information described in the foregoing embodiment. The second information may be information corresponding to an incremental update manner, or may be information corresponding to a full update manner. For details, refer to the foregoing descriptions.

The policy control update request message may be, for example, an NPcf_AMPolicyControl_UpdateNotify Request message.

It should be noted that if the traffic steering information carries the internal group identifier, the AM-PCF performs this step for the UE corresponding to the internal group identifier. If the traffic steering information carries the indication information, the AM-PCF performs this step for all the UEs.

For incremental update, the AMF obtains and stores the updated DNAI information based on the currently stored DNAI information (that is, the first information described in the foregoing embodiment) and the DNAI information received from the AM-PCF (that is, the second information described in the foregoing embodiment).

For full update, the AMF uses the DNAI information received from the AM-PCF (that is, the second information described in the foregoing embodiment) as the updated DNAI information for storage.

Step 507: The AMF sends a policy control update response message to the AM-PCF. Correspondingly, the AM-PCF may receive the policy control update response message.

The policy control update response message may be, for example, an NPcf_AMPolicyControl_UpdateNotify Response message.

Step 508: The AMF reselects the I-SMF based on the updated DNAI information.

The AMF determines, based on an identifier of the first session, a first DNAI corresponding to the first session in the updated DNAI information, and then selects an I-SMF that supports all or a part of DNAIs in the first DNAI. In other words, the I-SMF before the reselection is the old I-SMF shown in FIG. 5, and the I-SMF after the reselection is the new I-SMF shown in FIG. 5.

Based on this embodiment, the AMF may obtain the updated DNAI information in a process of the PDU session, and reselect an I-SMF based on the updated DNAI information, to select a proper I-SMF for the UE.

Figure 6A:
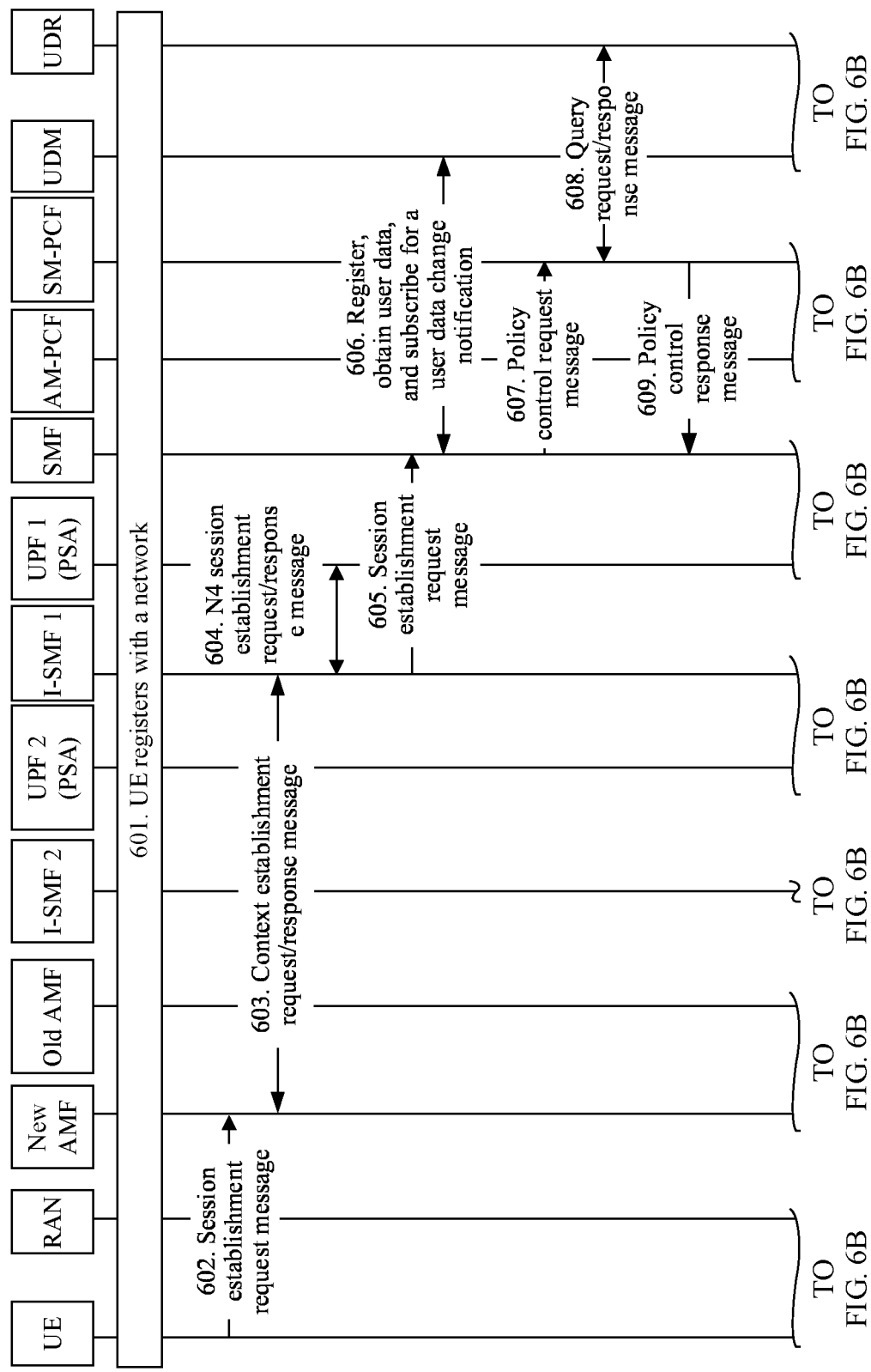

With reference to FIG. 6A and FIG. 6B, this application provides another method for selecting an SMF. In this embodiment, in a session establishment process, an AMF first selects an SMF (that is, an I-SMF 1) for UE, and then reselects an SMF (that is, an I-SMF 2) corresponding to the first session for the UE after obtaining a DNAI corresponding to a first session. The I-SMF 1 herein is the third SMF in the foregoing embodiment, and the I-SMF 2 is the first SMF in the foregoing embodiment.

The method includes the following steps.

Step 601: The UE registers with a network.

For a process in which the UE registers with the network, refer to the descriptions in the conventional technologies. Details are not described herein.

Step 602: The UE sends a session establishment request message to a new AMF. Correspondingly, the new AMF may receive the session establishment request message.

Optionally, the session establishment request message carries an identifier of a first session. The identifier of the first session may include a DNN and S-NSSAI.

Step 603: The AMF determines based on a current location of the UE that an I-SMF needs to be inserted, and the AMF obtains, through configuration or through querying using an NRF, an I-SMF 1 that serves the UE at the current location. The AMF sends a context establishment request message to a selected I-SMF 1. The message carries the DNN, the S-NSSAI, a user identifier, and an internal group identifier of the UE. In addition, the I-SMF 1 sends a context response message to the AMF.

Optionally, the context establishment request message may be an Nsmf_PDUSession_CreateSMContext Request message. The context establishment response message may be, for example, an Nsmf_PDUSession_CreateSMContext Response message.

Step 604: The I-SMF 1 selects a UPF 1, and then sends an N4 session establishment request message to the UPF 1. The UPF 1 returns an N4 session establishment response message to the I-SMF 1.

Step 605: The I-SMF 1 sends a session establishment request message to the SMF. The message carries the DNN, the S-NSSAI, the user identifier, and the internal group identifier of the UE. Correspondingly, the SMF may receive the session establishment request message.

The session establishment request message may be, for example, an Nsmf_PDUSession_Create Request message.

Step 606: The SMF registers with a UDM to obtain user subscription data, and subscribes for a user data change notification.

Step 607: The SMF sends a policy control request message to an SM-PCF. Correspondingly, the SM-PCF may receive the policy control request message.

The policy control request message carries the DNN, the S-NSSAI, the user identifier, and the internal group identifier of the UE.

The policy control request message may be, for example, an Npcf_SMPolicyControl_Create Request message.

Step 608: The SM-PCF interacts with a UDR, and obtains policy subscription information of a user.

In implementation, the SM-PCF may send a query request message to the UDR, and then the UDR sends a query response message to the SM-PCF. The query response message includes the policy subscription information of the user.

The query request message may be a NUdr_DM_Query Request message. The query response message may be a NUdr_DM_Query Response message.

Step 609: The SM-PCF sends a policy control response message to the SMF after executing a policy. Correspondingly, the SMF may receive the policy control response message.

The policy control response message may be, for example, an Npcf_SMPolicyControl_Create Response message.

The PCF formulates one or more PCC rules used for traffic steering control. Traffic steering control information in each PCC rule includes DNAI information. The DNAI information herein indicates the DNAI corresponding to the first session, or is referred to as a DNAI corresponding to the identifier of the first session.

Step 610: The SMF determines, based on the DNAI information included in the traffic steering control information in each PCC rule, the DNAI corresponding to the first session. The SMF sends a session establishment response message to the I-SMF 1. The message carries the DNAI corresponding to the first session. Correspondingly, the I-SMF 1 may receive the session establishment response message.

The policy control response message may be, for example, an Npcf_SMPolicyControl_Create Response message.

Step 611: The I-SMF 1 sends an information transfer message to the AMF, and the AMF returns an information transfer response message to the I-SMF 1.

The information transfer message may be, for example, a Namf_Communication_N1N2MessageTransfer message.

Step 612: The AMF sends an N2 session request message to a RAN. Correspondingly, the RAN may receive the N2 session request message.

Step 613: The RAN interacts with the UE to establish an RRC connection.

Step 614: The RAN returns an N2 session response message to the new AMF. Correspondingly, the new AMF may receive the N2 session response message.

Step 615: The new AMF sends a context update request message to the I-SMF 1. Correspondingly, the I-SMF 1 may receive the context update request message.

The context update request message may be an Nsmf_PDUSession_UpdateSMContext Request message.

Step 616: The I-SMF 1 updates an N4 session.

Step 617: The I-SMF 1 sends a context update response message to the new AMF. Correspondingly, the new AMF may receive the context update response message.

The context update response message may be, for example, an Nsmf_PDUSession_UpdateSMcontext Response message.

The context update response message includes the DNAI corresponding to the first session.

Step 618: The new AMF stores the DNAI corresponding to the first session, and reselects an I-SMF based on the DNAI corresponding to the first session. The AMF selects, based on the DNAI corresponding to the first session, an I-SMF (that is, an I-SMF 2) that supports all or a part of DNAIs. The new AMF may obtain, through configuration or through querying using an NRF, the I-SMF that supports the DNAI corresponding to the first session.

For example, the reselected SMF is the I-SMF 2, such that the I-SMF 2 can select a new UPF (the UPF 2 shown in the figure) as the PSA. Because the I-SMF 2 supports the DNAI, the selected UPF 2 also supports the DNAI. The UPF 2 may serve as the PSA, such that a proper PSA is selected for the UE, that is, a PSA that supports the DNAI corresponding to the identifier of the session is selected.

Figure 7:
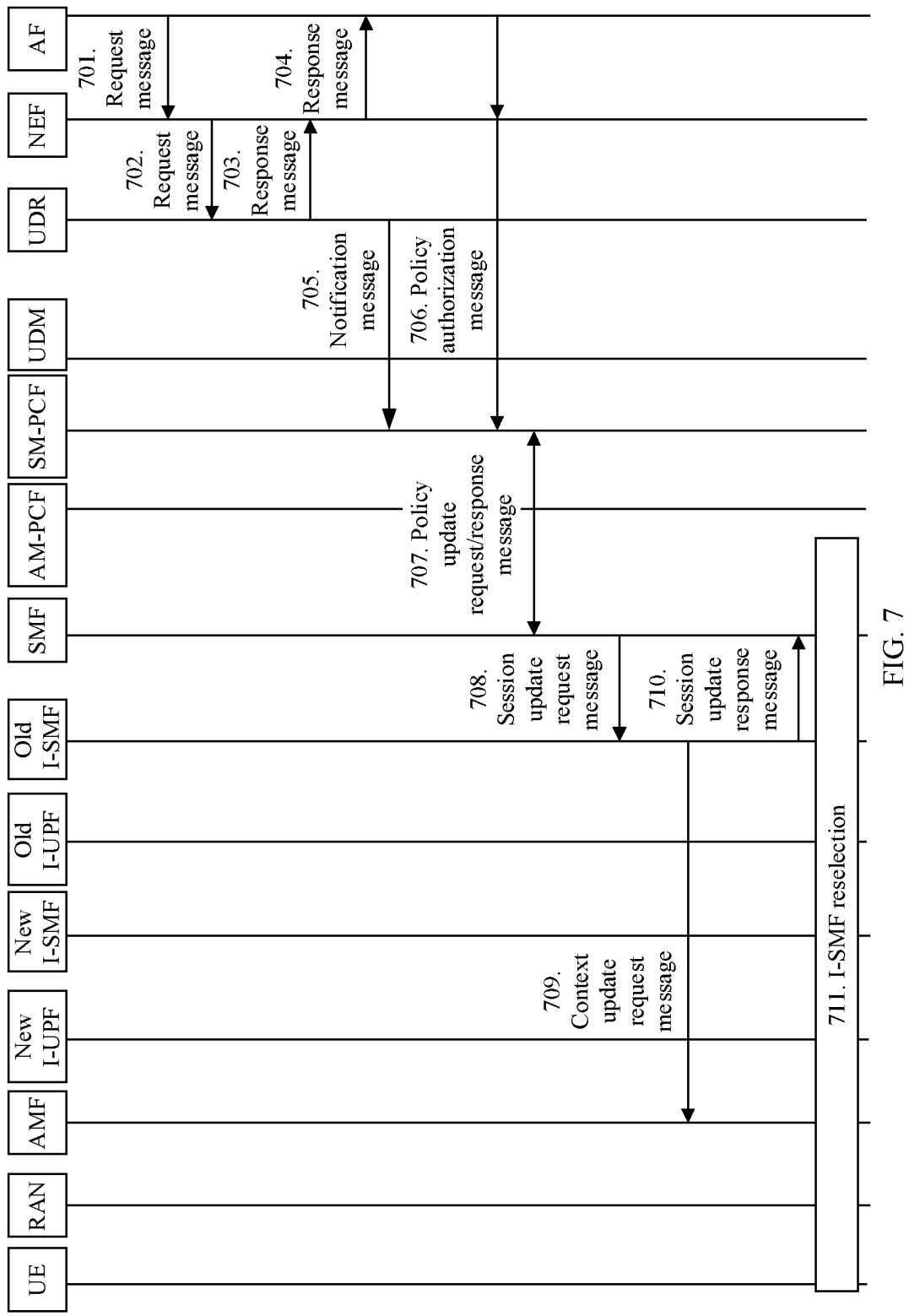
FIG. 7 is a schematic flowchart of another method for selecting an SMF according to this application.

With reference to FIG. 7, this application provides another method for selecting an SMF. It should be noted that the following step 701 to step 705 and the following step 706 are alternative. To be more specific, the following step 701 to step 705 and step 707 to step 711 (for a current PDU session or a future PDU session) are performed; or the following step 706 to step 711 (for a current PDU session) are performed.

The method includes the following steps.

Step 701: An AF sends a request message to an NEF. Correspondingly, the NEF may receive the request message.

The request message carries traffic steering information. The traffic steering information may carry an external group identifier or indication information. The external group identifier is used to indicate that the traffic steering information is applicable to one or more UEs corresponding to the external group identifier. The indication information is used to indicate that the traffic steering information is applicable to all UEs.

The traffic steering information further carries DNAI information, and the DNAI information includes a DNAI corresponding to a first session.

The request message may be, for example, an Nnef_TrafficInfluence_Create Request message.

Step 702: The NEF sends a request message to a UDR. The request message carries the traffic steering information. Correspondingly, the UDR may receive the request message.

For example, the request message may be, for example, a Nudr_DataRepository_Create Request message.

It should be noted that if the traffic steering information carries the external group identifier, the NEF further needs to map the external group identifier into an internal group identifier. In other words, the traffic steering information sent by the NEF to the UDR carries the internal group identifier and the DNAI information.

If the traffic steering information carries the indication information, the traffic steering information sent by the NEF to the UDR carries the indication information and the DNAI information.

Step 703: The UDR stores the DNAI information, and returns a response message to the NEF. Correspondingly, the NEF may receive the response message.

The response message may be, for example, a Nudr_DataRepository_Create Response message.

If the traffic steering information carries the internal group identifier, the UDR stores a correspondence between the internal group identifier and the DNAI information. Alternatively, the UDR first determines, based on the internal group identifier, an identifier of UE corresponding to the internal group identifier, and then stores a correspondence between the identifier of the UE and the DNAI information.

If the traffic steering information carries the indication information, the UDR stores the DNAI information without being associated with the UE, to indicate that the DNAI information is applicable to all the UEs.

Step 704: The NEF sends a response message to the AF. Correspondingly, the AF may receive the response message.

The response message may be, for example, an Nnef_TrafficInfluence_Create Response message.

Step 704 is optional.

Step 705: The UDR sends a notification message to all subscriber SM-PCFs. The notification message carries the traffic steering information. Correspondingly, the SM-PCF may receive the notification message.

Step 706: The AF sends a policy authorization message to the SM-PCF. The message includes the traffic steering information. The traffic steering information carries the DNAI corresponding to the first session. Correspondingly, the SM-PCF may receive the traffic steering information.

The policy authorization message may be, for example, an Npcf_Policy Authorization message.

It should be noted that the AF may send the policy authorization message to the SM-PCF using the NEF.

Step 707: The SM-PCF formulates a PCC rule based on the traffic steering information provided by the AF. The PCC rule includes the traffic steering information. The SM-PCF sends a policy control update request message to the SMF. The message carries the updated PCC rule. The SMF stores the PCC rule, and then returns a policy control update response message.

The policy control update request message may be, for example, an NPcf_AMPolicyControl_UpdateNotify Request message. The policy control update response message may be, for example, an NPcf_AMPolicyControl_UpdateNotify Response message.

It should be noted that if the traffic steering information carries the internal group identifier, the SM-PCF performs this step for the UE corresponding to the group identifier. If the traffic steering information carries the indication information, the SM-PCF performs this step for all the UEs.

Step 708: The SMF determines, based on the traffic steering information in the PCC rule, the DNAI corresponding to the first session, and sends a session update request message to an old I-SMF. The message carries the updated DNAI. Correspondingly, the old I-SMF may receive the session update request message.

In a full update manner, the updated DNAI herein includes all DNAIs corresponding to the first session. In an incremental update manner, the updated DNAI herein includes a newly added DNAI corresponding to the first session.

Step 709: The old I-SMF sends a context update request message to the AMF. The message carries the updated DNAI. Correspondingly, the AMF may receive the context update request message.

The context update request message may be an Nsmf_PDUSession_UpdateSMContext Request message.

Step 710: The old I-SMF sends a session update response message to the SMF. Correspondingly, the old I-SMF may receive the session update response message.

This step is optional.

Step 711: The AMF reselects an I-SMF based on the updated DNAI.

The AMF determines, based on the updated DNAI, a newest DNAI corresponding to the first session, and then selects an I-SMF that supports all or a part of DNAIs in the newest DNAI. In other words, the I-SMF before the reselection is the old I-SMF shown in FIG. 7, and the I-SMF after the reselection is the new I-SMF shown in FIG. 7.

Because the new I-SMF supports the DNAI, the selected new I-UPF also supports the DNAI. In this way, the new I-UPF may serve as a PSA, such that a proper PSA is selected for the UE, that is, a PSA that supports the DNAI corresponding to the identifier of the session is selected.

Figure 8:
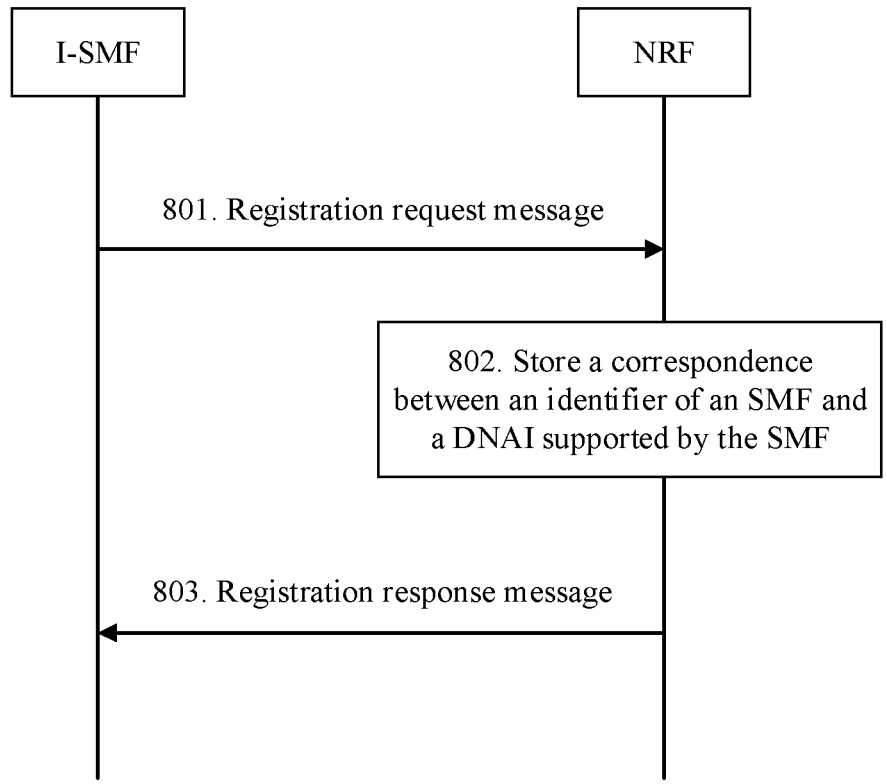
FIG. 8 is a schematic flowchart of a registration method of an SMF according to this application.

Further, with reference to FIG. 8, this application further provides a registration method of an SMF. In this method, in a process of registering with an NRF, an I-SMF may send, to the NRF, a DNAI supported by the I-SMF, such that an AMF can learn of a DNAI supported by each I-SMF. In other words, this embodiment may be combined with the embodiments shown in FIG. 4A and FIG. 4B to FIG. 7. The I-SMF may be the first SMF, the second SMF, the fourth SMF, or the like in the foregoing embodiments.

The method includes the following steps.

Step 801: The I-SMF sends a registration request message to the NRF. The registration request message includes an identifier of the SMF and a DNAI supported by the SMF. Correspondingly, the NRF may receive the registration request message.

The registration request message may be, for example, an Nnrf_NFManagement_NFRegister Request message.

In an implementation method, the registration request message may carry an NF profile of the I-SMF. The NF profile includes the DNAI supported by the I-SMF.

Step 802: The NRF stores a correspondence between the identifier of the SMF and the DNAI supported by the SMF.

If the registration request message includes the NF profile, the NRF stores the NF profile.

Step 803: The NRF sends a registration response message to the SMF. The registration response message is used to determine that registration is completed. Correspondingly, the NRF may receive the registration response message.

The registration request message may be, for example, an Nnrf_NFfManagement_NFRegister_Response message.

Based on this embodiment, the NRF obtains the DNAI supported by the I-SMF, such that the AMF can query the DNAI supported by the I-SMF.

The solutions provided in this application are mainly described above from a perspective of interaction between network elements. It may be understood that, to implement the foregoing functions, each network element includes a corresponding hardware structure and/or software module for implementing each function. A person skilled in the art should be aware that, in combination with the examples described in the embodiments disclosed in this specification, units and algorithm steps may be implemented by hardware or a combination of hardware and computer software in the present disclosure. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present disclosure.

Figure 9:
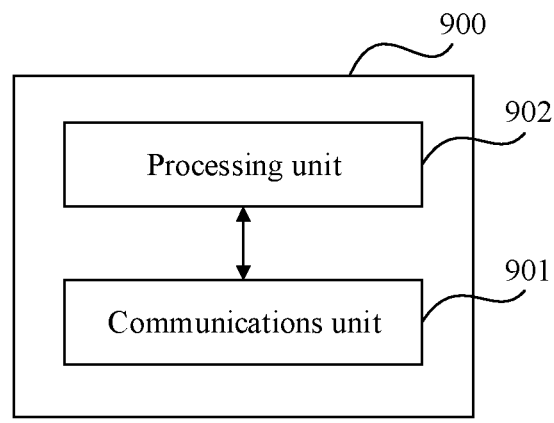
FIG. 9 is a schematic diagram of an apparatus according to this application.

FIG. 9 is a possible example block diagram of an apparatus 900 in this application, and the apparatus 900 may exist in a form of software or hardware. The apparatus 900 may include a processing unit 902 and a communications unit 901. In an implementation, the communications unit 901 may include a receiving unit and a sending unit. The processing unit 902 is configured to control and manage an action of the apparatus 900. The communications unit 901 is configured to support the apparatus 900 to communicate with another network entity.

The processing unit 902 may be a processor or a controller, for example, may be a general-purpose central processor (CPU), a general-purpose processor, a digital signal processor (DSP), an application-specific integrated circuit (ASIC), a field programmable gate array (FPGA), or another programmable logic device, a transistor logic device, a hardware component, or any combination thereof. The processing unit 902 may implement or execute various example logical blocks, modules, and circuits described with reference to content disclosed in this application. Alternatively, the processor 902 may be a combination of processors implementing a computing function, for example, a combination of one or more microprocessors, or a combination of a DSP and a microprocessor. The communications unit 901 is an interface circuit of the apparatus 900, and is configured to receive a signal from another apparatus. For example, when the apparatus 900 is implemented as a chip, the communications unit 901 is an interface circuit, of the chip, that is configured to receive a signal from another chip or apparatus, or the communications unit 901 is an interface circuit, of the chip, that is configured to send a signal to another chip or apparatus.

The apparatus 900 may be the mobility management network element, the session management network element, the policy control network element, or the network repository network element in the foregoing embodiments; or may be a chip used in the mobility management network element, the session management network element, the policy control network element, or the network repository network element. For example, when the apparatus 900 is the mobility management network element, the session management network element, the policy control network element, or the network repository network element, the processing unit 902 may be, for example, a processor, and the communications unit 901 may be, for example, a transceiver. Optionally, the transceiver may include a radio frequency circuit, and the storage unit may be, for example, a memory. For example, when the apparatus 900 is the mobility management network element, the session management network element, the policy control network element, or the network repository network element, the processing unit 902 may be, for example, a processor, and the communications unit 901 may be, for example, an input/output interface, a pin, or a circuit. The processing unit 902 may execute computer execution instructions stored in the storage unit. Optionally, the storage unit is a storage unit in the chip, for example, a register or a cache. Alternatively, the storage unit may be a storage unit that is located outside the chip and that is in the mobility management network element, the session management network element, the policy control network element, or the network repository network element, for example, a read-only memory (ROM) or another type of static storage device that can store static information and instructions, or a random-access memory (RAM).

In a first embodiment, the apparatus 900 is the mobility management network element in the foregoing embodiments. The processing unit 902 is configured to determine a first DNAI corresponding to a first session of a terminal device. The communications unit 901 is configured to select, for the first session of the terminal device, a first session management network element that supports all or a part of DNAIs in the first DNAI.

In a possible implementation method, that the processing unit 902 is configured to determine the first data network access identifier (DNAI) corresponding to the first session of the terminal device includes that the processing unit 902 is configured to: obtain first information using the communications unit 901, where the first information includes an identifier of a session of the terminal device and a second DNAI corresponding to the identifier of the session of the terminal device, where the second DNAI is one or more DNAIs, and where the identifier of the session of the terminal device includes an identifier of the first session; obtain the identifier of the first session using the communications unit 901; and determine, based on the identifier of the first session and the first information, the first DNAI corresponding to the first session.

In a possible implementation method, the communications unit 901 is further configured to obtain second information. The second information includes the identifier of the first session and a third DNAI corresponding to the identifier of the first session. The third DNAI is one or more DNAIs. The processing unit 902 is further configured to: determine a fourth DNAI based on the third DNAI; and select, for the first session of the terminal device, a second session management network element that supports all or a part of DNAIs in the fourth DNAI.

In a possible implementation method, the fourth DNAI is the same as the third DNAI. Alternatively, the fourth DNAI includes the first DNAI and the third DNAI.

In a possible implementation method, that the communications unit 901 is configured to obtain the first information includes that the communications unit 901 is configured to receive the first information from a policy control network element or another mobility management network element.

In a possible implementation method, that the communications unit 901 is configured to obtain the identifier of the first session includes that the communications unit 901 is configured to: receive a request message from the terminal device, where the request message includes the identifier of the first session, and where the request message is used to request to establish the first session; or receive context information of the terminal device from another mobility management network element, where the context information includes the identifier of the first session.

In a possible implementation method, that the processing unit 902 is configured to determine the first DNAI corresponding to the first session of the terminal device includes that the processing unit 902 is configured to receive, using the communications unit 901, the first DNAI corresponding to the first session from a policy control network element or another mobility management network element.

In a possible implementation method, the processing unit 902 is further configured to select a third session management network element for the first session of the terminal device. That the processing unit 902 is configured to select, for the first session, the first session management network element that supports all or a part of the DNAIs in the first DNAI includes that the processing unit 902 is configured to: if determining that the third session management network element does not support all or a part of the DNAIs in the first DNAI, select, for the first session, the first session management network element that supports all or a part of the DNAIs in the first DNAI.

In a possible implementation method, the communications unit 901 is further configured to receive a fifth DNAI corresponding to the first session from the policy control network element. The fifth DNAI is one or more DNAIs. The processing unit 902 is further configured to: determine a sixth DNAI based on the fifth DNAI; and select, for the first session of the terminal device, a fourth session management network element that supports all or a part of DNAIs in the sixth DNAI.

In a possible implementation method, the sixth DNAI is the same as the fifth DNAI. Alternatively, the sixth DNAI includes the first DNAI and the fifth DNAI.

In a possible implementation method, the identifier of the first session includes one or more of the following: a DNN or S-NSSAI.

In a possible implementation method, the communications unit 901 is further configured to obtain, from a network repository network element, a DNAI supported by the first session management network element.

In a second embodiment, the apparatus is the policy control network element in the foregoing embodiments. The processing unit 902 is configured to obtain first information. The first information includes an identifier of a session of a terminal device and a second DNAI corresponding to the identifier of the session of the terminal device. The second DNAI is one or more DNAIs. The communications unit 901 is configured to send the first information to a mobility management network element. The first information is used by the mobility management network element to select a session management network element.

In a possible implementation method, that the policy control network element sends the first information to the mobility management network element includes that the policy control network element sends the first information to the mobility management network element in a registration process of the terminal device.

In a third embodiment, the apparatus is the policy control network element in the foregoing embodiments. The processing unit 902 is configured to: obtain a first DNAI corresponding to a first session of a terminal device. The communications unit 901 is configured to send, to the mobility management network element, the first DNAI corresponding to the first session.

In a possible implementation method, that the policy control network element sends, to the mobility management network element, the first DNAI corresponding to the first session includes that the policy control network element sends, to the mobility management network element in a session establishment process, the first DNAI corresponding to the first session.

In a fourth embodiment, the apparatus 900 is the session management network element in the foregoing embodiments. The communications unit 901 is configured to: send a registration request message to a network repository network element, where the registration request message includes an identifier of a session management network element and a DNAI supported by the session management network element; and receive a registration response message from the network repository network element, where the registration response message is used to determine that registration is completed.

In a fifth embodiment, the apparatus 900 is the network repository network element in the foregoing embodiments. The communications unit 901 is configured to: receive a registration request message from a session management network element, where the registration request message includes an identifier of the session management network element and a DNAI supported by the session management network element; and send a registration response message to the session management network element, where the registration response message is used to determine that registration is completed. A storage unit is configured to store a correspondence between the identifier of the session management network element and the DNAI supported by the session management network element.

It may be understood that, for an implementation process and a corresponding beneficial effect of the apparatus when the apparatus is used for the method for selecting a session management network element, reference may be made to related descriptions in the foregoing method embodiments. Details are not described herein again.

If the apparatus is the mobility management network element, the session management network element, the policy control network element, or the network repository network element, the mobility management network element, the session management network element, the policy control network element, or the network repository network element is presented in an integrated manner in a form of function modules obtained through division. The "module" herein may be a specific ASIC, a circuit, a processor and a memory that execute one or more software or firmware programs, an integrated logic circuit, and/or another component that can provide the foregoing functions. In a simple embodiment, it may be appreciated by a person skilled in the art that the mobility management network element, the session management network element, the policy control network element, or the network repository network element may use a form shown in FIG. 10.

Figure 10:
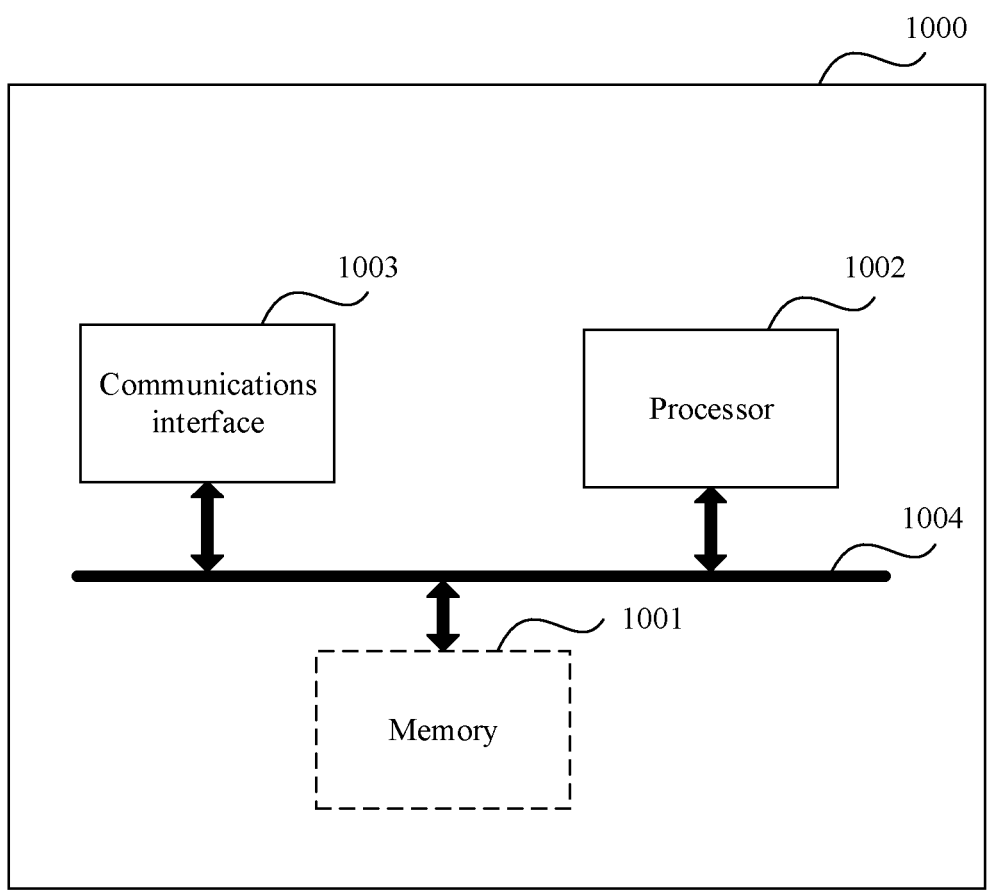
FIG. 10 is a schematic diagram of another apparatus according to this application.

For example, a processor 1002 in FIG. 10 may invoke computer execution instructions stored in a memory 1001, such that the mobility management network element, the session management network element, the policy control network element, or the network repository network element performs the methods in the foregoing method embodiment.

In some aspects, functions/implementation processes of the communications unit 901 and the processing unit 902 in FIG. 9 may be implemented by the processor 1002 in FIG. 10 through invoking computer execution instructions stored in the memory 1001. Alternatively, functions/implementation processes of the processing unit 902 in FIG. 9 may be implemented by the processor 1002 in FIG. 10 through invoking computer execution instructions stored in the memory 1001, and functions/implementation processes of the communications unit 901 in FIG. 9 may be implemented using a communications interface 1003 in FIG. 10.

Optionally, when the apparatus 900 is a chip or a circuit, the functions/implementation processes of the communications unit 901 may be further implemented using a pin, a circuit, or the like.

FIG. 10 is a schematic diagram of another apparatus 1000 according to this application. The apparatus may be the mobility management network element, the session management network element, the policy control network element, or the network repository network element in the foregoing embodiments. The apparatus 1000 includes a processor 1002 and a communications interface 1003. Optionally, the apparatus 1000 may further include a memory 1001. Optionally, the apparatus 1000 may further include a communications line 1004. The communications interface 1003, the processor 1002, and the memory 1001 may be connected to each other through the communications line 1004. The communications line 1004 may be a peripheral component interconnect (PCI) bus, an extended industry standard architecture (EISA) bus, or the like. The communications line 1004 may be classified into an address bus, a data bus, a control bus, and the like. For ease of representation, only one thick line is used to represent the bus in FIG. 10, but this does not mean that there is only one bus or only one type of bus.

The processor 1002 may be a CPU, a microprocessor, an ASIC, or one or more integrated circuits configured to control program execution in the solutions of this application.

The communications interface 1003 uses any apparatus like a transceiver, and is configured to communicate with another device or communications network, such as the Ethernet, a radio access network (RAN), a wireless local area network (WLAN), or a wired access network.

The memory 1001 may be a ROM, another type of static storage device that can store static information and instructions, a RAM, or another type of dynamic storage device that can store information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be configured to carry or store expected program code in a form of instructions or a data structure and that can be accessed by a computer. However, it is not limited thereto. The memory 1001 may exist independently, and is connected to the processor through the communications line 1004. The memory 1001 may alternatively be integrated with the processor 1002.

The memory 1001 is configured to store computer executable instructions for performing the solutions in this application, and the processor 1002 controls the execution. The processor 1002 is configured to execute the computer executable instructions stored in the memory 1001, to implement a method for selecting a session management network element provided in the foregoing embodiments of this application.

Optionally, the computer-executable instructions in this embodiment of this application may also be referred to as application program code. This is not specifically limited in this embodiment of this application.

A person of ordinary skill in the art may understand that various reference numerals such as "first" and "second" in this application are merely used for differentiation for ease of description, and are not used to limit a scope of the embodiments of this application, or represent a sequence. The term "and/or" describes an association relationship between associated objects and indicates that three relationships may exist. For example, A and/or B may indicate the following three cases: Only A exists, both A and B exist, and only B exists. The character "/" generally represents an "or" relationship between the associated objects. "At least one" means one or more. "At least two" means two or more. "At least one", "any one", or a similar expression means any combination of these items, including a single item or any combination of a plurality of items. For example, at least one of a, b, or c may represent a, b, c, a-b, a-c, b-c, or a-b-c, where a, b, and c may be in a singular or plural form. "A plurality of" means two or more, and another quantifier is similar to this. In addition, an element appearing in singular forms "a", "an" and "the" does not mean "one or only one" but "one or more" unless otherwise specified in the context. For example, "a device" means one or more such devices.

All or a part of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a web site, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk drive, or a magnetic tape), an optical medium (for example, a DVD), a semiconductor medium (for example, a solid-state drive (SSD)), or the like.

The various illustrative logical units and circuits described in the embodiments of this application may implement or operate the described functions through a general-purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may alternatively be any conventional processor, controller, microcontroller, or state machine. The processor may alternatively be implemented by a combination of computing apparatuses, such as a digital signal processor and a microprocessor, multiple microprocessors, one or more microprocessors in combination with a digital signal processor core, or any other similar configuration.

Steps of the methods or algorithms described in the embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk drive, a removable magnetic disk, a CD-ROM, or a storage medium of any other form in the art. For example, the storage medium may be connected to a processor, such that the processor can read information from the storage medium and write information to the storage medium. Optionally, the storage medium may alternatively be integrated into the processor. The processor and the storage medium may be disposed in the ASIC.

These computer program instructions may also be loaded onto a computer or another programmable data processing device, such that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

Although this application is described with reference to features and the embodiments thereof, it is clear that various modifications and combinations may be made to them without departing from the spirit and scope of this application. Correspondingly, the specification and accompanying drawings are merely example descriptions of this application defined by the accompanying claims, and are considered as having covered any or all modifications, variations, combinations, or equivalents in the scope of this application. A person skilled in the art can make various modifications and variations to this application without departing from the scope of this application. This application is intended to cover these modifications and variations of this application provided that they fall within the scope of the claims of this application and their equivalent technologies.

What is claimed is:

1. A method comprising:
   determining, by a mobility management network element, a first data network access identifier (DNAI) corresponding to a first session of a terminal device when a third session management network element does not support all or a part of DNAIs in the first DNAI;
   obtaining, from a network repository network element by the mobility management network element, a DNAI supported by one or more session management network elements; and
   selecting, by the mobility management network element for the first session of the terminal device and based on the DNAI supported by the one or more session management network elements, a first session management network element that supports all DNAIs in the first DNAI,
   wherein the one or more session management network elements include the first session management network element.

2. The method of claim 1, wherein selecting the first session management network element comprises selecting, for the first session of the terminal device, the first session management network element based on the first DNAI and a DNAI supported by the first session management network element.

3. The method of claim 1, wherein determining the first DNAI comprises receiving, by the mobility management network element, the first DNAI from a session management network element.

4. The method of claim 3, further comprising selecting, by the mobility management network element, the third session management network element for the first session, wherein selecting the first session management network element comprises selecting the first session management network element when determining that the third session management network element does not support all or a part of the DNAIs in the first DNAI.

5. The method of claim 3, further comprising:
   receiving, by the mobility management network element, a fifth DNAI corresponding to the first session from a policy control network element, wherein the fifth DNAI is one or more DNAIs;
   determining, by the mobility management network element, a sixth DNAI based on the fifth DNAI; and
   selecting, by the mobility management network element for the first session of the terminal device, a fourth session management network element that supports all or a part of DNAIs in the sixth DNAI.

6. The method of claim 1, further comprising obtaining, from the network repository network element by the mobility management network element, a DNAI supported by the first session management network element.

7. The method of claim 6, further comprising:
   sending, by the first session management network element, a registration request message to the network repository network element, wherein the registration request message comprises an identifier of the first session management network element and the DNAI supported by the first session management network element;
   receiving, by the network repository network element, the registration request message;
   storing a correspondence between the identifier of the first session management network element and the DNAI supported by the first session management network element;
   sending a registration response message to the first session management network element; and
   receiving, by the first session management network element, the registration response message from the network repository network element.

8. An apparatus comprising:
   a memory configured to store instructions;
   a processor coupled to the memory and configured to execute the instructions to cause the apparatus to:
      determine a first data network access identifier (DNAI) corresponding to a first session of a terminal device when a third session management network element does not support all or a part of DNAIs in the first DNAI;
      obtain, from a network repository network element, a DNAI supported by one or more session management network elements; and
      select, for the first session of the terminal device and based on the DNAI supported by the one or more session management network elements, a first session management network element that supports all DNAIs in the first DNAI, wherein the one or more session management network elements include the first session management network element.

9. The apparatus of claim 8, wherein the apparatus selects the first session management network element based on the first DNAI and a DNAI supported by the first session management network element.

10. The apparatus of claim 8, wherein the apparatus determines the first DNAI by receiving the first DNAI from a session management network element.

11. The apparatus of claim 8, wherein the processor is configured to execute the instructions to further cause the apparatus to obtain a DNAI supported by the first session management network element.

12. The apparatus of claim 8, wherein the processor is configured to execute the instructions to further cause the apparatus to:

select the third session management network element for the first session of the terminal device; and select the first session management network element when determining that the third session management network element does not support all the DNAIs in the first DNAI.

13. The apparatus of claim 8, wherein the processor is configured to execute the instructions to further cause the apparatus to obtain, from the network repository network element, a DNAI supported by the first session management network element.

14. A system comprising:

a network repository network element;

a first session management network element configured to provide service for a terminal device; and a mobility management network element configured to:

determine a first data network access identifier (DNAI) corresponding to a first session of a terminal device when a third session management network element does not support all or a part of DNAIs in the first DNAI;

obtain, from the network repository network element, a DNAI supported by one or more session management network elements; and select, for the first session of the terminal device and based on the DNAI supported by the one or more session management network elements, the first session management network element, wherein the first session management network element is configured to support all DNAIs in the first DNAI, and wherein the one or more session management network elements include the first session management network element.

15. The system of claim 14, wherein the mobility management network element is further configured to select the first session management network element based on the first DNAI and a DNAI supported by the first session management network element.

16. The system of claim 15, wherein the mobility management network element is further is configured to obtain, from the network repository network element, the DNAI supported by the first session management network element.

17. The system of claim 16, wherein the first session management network element is configured to send a registration request message to the network repository network element and receive a registration response message received from the network repository network element, wherein the registration request message comprises an identifier of the first session management network element and the DNAI supported by the first session management network element, wherein the registration response message is to determine that registration is completed, wherein the network repository network element is configured to:

receive the registration request message from the first session management network element;

store a correspondence between the identifier of the first session management network element and the DNAI supported by the first session management network element; and send the registration response message to the first session management network element.

18. A non-transitory storage medium configured to store instructions which, when executed by a computer, cause the computer to:

determine a first data network access identifier (DNAI) corresponding to a first session of a terminal device when a third session management network element does not support all or a part of DNAIs in the first DNAI;

obtain, from a network repository network element, a DNAI supported by one or more session management network elements; and select, for the first session of the terminal device and based on the DNAI supported by the one or more session management network elements, a first session management network element that supports all DNAIs in the first DNAI, wherein the one or more session management network elements include the first session management network element.

19. The non-transitory storage medium of claim 18, wherein when the instructions are executed by the computer, the instructions cause the computer to select the first session management network element based on the first DNAI and a DNAI supported by the first session management network element.

20. The non-transitory storage medium of claim 18, wherein when the instructions are executed by the computer, the instructions further cause the computer to obtain, from the network repository network element, a DNAI supported by the first session management network element.

* * * * *

UNITED STATES PATENT AND TRADEMARK OFFICE
CERTIFICATE OF CORRECTION

| | |
|---|---|
| PATENT NO. | : 12,150,205 B2 |
| APPLICATION NO. | : 17/582528 |
| DATED | : November 19, 2024 |
| INVENTOR(S) | : Xiaoyun Zhou and Zaifeng Zong |

It is certified that error appears in the above-identified patent and that said Letters Patent is hereby corrected as shown below:

On the Title Page

Page 2, item (56) References Cited, Foreign Patent Documents: "WO 109995844 A 7/2019" should read "CN 109995844 A 7/2019"

Signed and Sealed this
Thirty-first Day of December, 2024

Derrick Brent
*Acting Director of the United States Patent and Trademark Office*